United States Patent
Wiegand et al.

(10) Patent No.: US 11,895,290 B2
(45) Date of Patent: **\*Feb. 6, 2024**

(54) COMPOSED PREDICTION AND RESTRICTED MERGE

(71) Applicant: Fraunhofer-Gesellschaft zur Foerderung der angewandten Forschung e.V., Munich (DE)

(72) Inventors: Thomas Wiegand, Berlin (DE); Detlev Marpe, Berlin (DE); Heiko Schwarz, Berlin (DE); Martin Winken, Berlin (DE); Christian Bartnik, Berlin (DE); Jonathan Pfaff, Berlin (DE); Philipp Helle, Berlin (DE); Mischa Siekmann, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 122 days.

This patent is subject to a terminal disclaimer.

(21) Appl. No.: 17/700,360

(22) Filed: Mar. 21, 2022

(65) Prior Publication Data

US 2022/0286665 A1 Sep. 8, 2022

Related U.S. Application Data

(63) Continuation of application No. 17/002,578, filed on Aug. 25, 2020, now Pat. No. 11,284,065, which is a (Continued)

(30) Foreign Application Priority Data

Feb. 28, 2018 (EP) ..................................... 18159304

(51) Int. Cl.
*H04N 19/103* (2014.01)
*H04N 19/107* (2014.01)
(Continued)

(52) U.S. Cl.
CPC ......... *H04N 19/103* (2014.11); *H04N 19/107* (2014.11); *H04N 19/109* (2014.11);
(Continued)

(58) Field of Classification Search
CPC .. H04N 19/103; H04N 19/107; H04N 19/109; H04N 19/11; H04N 19/159;
(Continued)

(56) References Cited

U.S. PATENT DOCUMENTS 8,085,845 B2 * 12/2011 Tourapis ................ H04N 19/86
375/240.16
9,531,990 B1 * 12/2016 Wilkins ............... H04N 19/176
(Continued)

FOREIGN PATENT DOCUMENTS

| JP | 2007503775 A | 2/2007 |
|---|---|---|
| KR | 20170084055 A | 7/2017 |
| WO | 2005022919 A1 | 3/2005 |

OTHER PUBLICATIONS

Cha, Run, et al., "Improved Combined Inter-Intra Prediction Using Spatial-Variant Weighted Coefficient", Run Cha, et al., Improved Combined Inter-Intra Prediction Using Spatial-Variant Weighted Coefficient, 2011 IEEE International Conference on Multimedia and Expo, IEEE, Jul. 2011, pp. 1-5.
(Continued)

*Primary Examiner* — Francis Geroleo
(74) *Attorney, Agent, or Firm* — Andrew M. Metrailer; Conley Rose, P.C.

(57) ABSTRACT

A video coding method and apparatus for codes a video in a data stream using block-based predictive coding by deriving a collection of one or more primitive predictions for a block using a set of primitive prediction modes adapted for predicting blocks of a picture of the video. Each primitive prediction in the collection of primitive predictions is
(Continued)

derived using a respective primitive prediction mode from the set of primitive prediction modes. A composite prediction signal for the block is composed by combining primitive predictions from the collection of one or more primitive predictions, and the block is predicted using the composite prediction signal.

16 Claims, 18 Drawing Sheets

Related U.S. Application Data continuation of application No. PCT/EP2019/054896, filed on Feb. 27, 2019.

(51) Int. Cl.
*H04N 19/109* (2014.01)
*H04N 19/11* (2014.01)
*H04N 19/159* (2014.01)
*H04N 19/176* (2014.01)

(52) U.S. Cl.
CPC ........... *H04N 19/11* (2014.11); *H04N 19/159* (2014.11); *H04N 19/176* (2014.11)

(58) Field of Classification Search
CPC .. H04N 19/176; H04N 19/198; H04N 19/157; H04N 19/174; H04N 19/192; H04N 19/196; H04N 19/46; H04N 19/593; H04N 19/105; H04N 19/513

See application file for complete search history.

(56) References Cited

U.S. PATENT DOCUMENTS

| | | | | |
|---|---|---|---|---|
| 9,813,700 | B1* | 11/2017 | Bultje | H04N 5/765 |
| 10,362,332 | B2* | 7/2019 | Mukherjee | H04N 19/53 |
| 2007/0047648 | A1 | 3/2007 | Tourapis et al. | |
| 2007/0053443 | A1 | 3/2007 | Song | |
| 2010/0098156 | A1 | 4/2010 | Karczewicz et al. | |
| 2012/0250769 | A1* | 10/2012 | Bross | H04N 19/46 |
| | | | | 375/240.16 |
| 2013/0044812 | A1 | 2/2013 | Ye et al. | |
| 2015/0131724 | A1* | 5/2015 | Lin | H04N 19/573 |
| | | | | 375/240.14 |
| 2016/0165248 | A1 | 6/2016 | Lainema et al. | |
| 2016/0191920 | A1* | 6/2016 | Kim | H04N 19/119 |
| | | | | 375/240.13 |
| 2018/0063531 | A1 | 3/2018 | Hu et al. | |
| 2018/0270502 | A1* | 9/2018 | Mukherjee | H04N 19/11 |
| 2018/0288410 | A1 | 10/2018 | Park et al. | |

OTHER PUBLICATIONS

"Audiovisional and Multimedia Systems/Infrastructure of audiovisual services—coding of moving video", ITU-T Series H, Telecommunication Standardization Sector of ITU H264, Apr. 2017.

"High efficiency video coding", ITU-T Series H, Telecommunication Standardization Sector of ITU Audiovisual and Mul Ti Media Systems H.265, Dec. 2016.

Albrecht, M, et al., "Description of SDR, HDR and 360 video coding technology proposal by Fraunhofer HHI", 10. JVET Meeting; Apr. 10, 2018-Apr. 20, 2018; San Diego; (The Joint Video Exploration Team of ISO/IEC JTC1/SC29/WG11 and ITU-T SG.16); URL: http://phenix.int-evry.fr/jvet/,No. JVET-J0014-v4, Apr. 12, 2018 (Apr. 12, 2018), XP030151173.

Chen, J, et al., "Description of scalable video coding technology proposal by Qualcomm (configuration 2)", 11. JCT-VC Meeting; 102. MPEG Meeting; Oct. 10, 2012-Oct. 19, 2012; Shanghai; (Joint Collaborative Team on Video Goding of ISO/IEC JTC1/SC29/WG11 and ITU-T SG.16); URL: http://wftp3.itu.int/av-arch/jctvcsite/, No. JCTVC-K0036, Oct. 2, 2012 (Oct. 2, 2012), XP030112968.

Chen, J, et al., "Algorithm description of Joint Exploration Test Model 3 (JEM3)", 3. JVET Meeting; May 26, 2016-Jun. 1, 2016; Geneva; (The Joint Video Exploration Team of ISO/IEC JTC1/SC29/WG11 and ITU-T SG.16 ); URL: http://phenix.intevry. fr/jvet/,No. JVET-C1001, Jul. 2, 2016 (Jul. 2, 2016), XP030150223.

First Examination Report for IN Application No. 202238001502, dated Aug. 25, 2022, Intellectual Property India, India.

First Examination Report for IN Application No. 202238001493, dated Aug. 2, 2022, Intellectual Property India, India.

Examination Report for JP Application No. 2020-545177, dated Jun. 21, 2022, Japanese Patent Office (English Translation).

First Examination Report for IN Application No. 202238001507, dated Aug. 8, 2022, Intellectual Property India, India.

First Examination Report for IN Application No. 202238001500, dated Aug. 2, 2022, Intellectual Property India, India.

Chen, J, et al., "High efficiency video coding (HEVC) scalable extension Draft 6", 3. JCT-VC Meeting; Mar. 27, 2014-Apr. 4, 2014; Valencia; (Joint Collaborative Team on Video Coding (JCT-VC) of ITU-T SG 16 WP 3 and ISO/IEC JTC 1/SC 29/WG 11), No. JCTVC-Q1008_v5.

Chen, J, et al., "Scalable Video Coding Extension for HEVC", Qualcomm Technology Inc. 5775 Morehouse Drive, San Diego, CA.

* cited by examiner

```
prediction_unit( x0, y0, nPbW, nPbH ) {                                      Descriptor
    ...
    if( ! cu_skip_flag[ x0 ][ y0 ] ) {                       ─208
        i = NumMergedAdditionalHypotheseis                   ─209
        readMore = 1
        while( i < MaxNumAdditionalHypotheseis && readMore ) {
            additional_hypothesis_flag[ x0 ][ y0 ][ i ]                      ae(v)
            if( additional_hypothesis_flag[ x0 ][ y0 ][ i ] ) {
                ref_idx_add_hyp[ x0 ][ y0 ][ i ]
                mvd_coding( x0, y0, 2+i )
                mvp_add_hyp_flag[ x0 ][ y0 ][ i ]                            ae(v)
                add_hyp_weight_idx[ x0 ][ y0 ][ i ]                          ae(v)
            }
            readMore = additional_hypothesis_flag[ x0 ][ y0 ][ i ]
            i++
        }
    }
}
```

Fig. 9

| | Descriptor |
|---|---|
| prediction_unit( x0, y0, nPbW, nPbH ) { | |
| ... | |
| if( ! cu_skip_flag[ x0 ][ y0 ] ) { | |
| i = 0~~NumMergedAdditionalHypothesis~~ 209 | |
| readMore = 1 | |
| while( i < MaxNumAdditionalHypotheseis && readMore ) { | |
|   additional_hypothesis_flag[ x0 ][ y0 ][ i ] | ae(v) |
|   if( additional_hypothesis_flag[ x0 ][ y0 ][ i ] ) { | |
|     ref_idx_add_hyp[ x0 ][ y0 ][ i ] | ae(v) |
|     mvd_coding( x0, y0, 2+i ) | |
|     mvp_add_hyp_flag[ x0 ][ y0 ][ i ] | ae(v) |
|     add_hyp_weight_idx[ x0 ][ y0 ][ i ] | ae(v) |
|   } | |
|   readMore = additional_hypothesis_flag[ x0 ][ y0 ][ i ] | |
|   i++ | |
| } | |
| } | |
| } | |

210 — additional_hypothesis_flag
212 — ref_idx_add_hyp
214 — mvd_coding
216 — mvp_add_hyp_flag
218 — add_hyp_weight_idx

Fig. 10

| | Descriptor |
|---|---|
| prediction_unit( x0, y0, nPbW, nPbH ) { | |
|   if( cu_skip_flag[ x0 ][ y0 ]) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( slice_type == B ) { | |
|         restricted_merge_flag[ x0 ][ y0 ] | ae(v) |
|       if( restricted_merge_flag[ x0 ][ y0 ] ) | |
|         restricted_merge_list[ x0 ][ y0 ] | ae(v) |
|       } | |
|       if( MaxNumMergeCand > 1 ) | |
|         merge_idx[ x0 ][ y0 ] | ae(v) |
|     } else { | |
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding(x0, y0, 0) | |
|         mvp_l0_flag[ x0 ][ y0 ] | ae(v) |
|       } | |
|       if( inter_pred_idc[ x0 ][ y0 ] != PRED_L0 ) { | |

Fig. 11a

```
if( num_ref_idx_l1_active_minus1 > 0 )
    ref_idx_l1[ x0 ][ y0 ]                                              ae(v)
if( mvd_l1_zero_flag && inter_pred_idc[ x0 ][ y0 ] = = PRED_BI ) {
    MvdL1[ x0 ][ y0 ][ 0 ] = 0
    MvdL1[ x0 ][ y0 ][ 1 ] = 0
} else
    mvd_coding( x0, y0, 1 )
mvp_l1_flag[ x0 ][ y0 ]                                                 ae(v)
}
i = 0
readMore = 1
while( i < MaxNumAdditionalHypotheseis && readMore ) {        ─209
    additional_hypothesis_flag[ x0 ][ y0 ][ i ]                         ae(v)
    if( additional_hypothesis_flag[ x0 ][ y0 ][ i ] ) {
        ref_idx_add_hyp[ x0 ][ y0 ][ i ]                                ae(v)
        mvd_coding( x0, y0, 2+i )
        mvp_add_hyp_flag[ x0 ][ y0 ][ i ]                               ae(v)
        add_hyp_weight_idx[ x0 ][ y0 ][ i ]                             ae(v)
    }
    readMore = additional_hypothesis_flag[ x0 ][ y0 ][ i ]
    i++
}
}
```

| coding_unit( x0, y0, log2CbSize ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( palette_mode_enabled_flag && CuPredMode[ x0 ][ y0 ] == MODE_INTRA && <br>        log2CbSize <= MaxTbLog2SizeY ) | |
|       palette_mode_flag[ x0 ][ y0 ] | ae(v) |
|     if( palette_mode_flag[ x0 ][ y0 ] ) | |
|       palette_coding( x0, y0, nCbS ) | |
|     else { | |
|       if( CuPredMode[ x0 ][ y0 ] != MODE_INTRA <br>        log2CbSize == MinCbLog2SizeY ) | |
|         part_mode | ae(v) |
|       if( CuPredMode[ x0 ][ y0 ] == MODE_INTRA ) { | |
|         if( PartMode == PART_2Nx2N && pcm_enabled_flag && <br>          log2CbSize >= Log2MinIpcmCbSizeY && <br>          log2CbSize <= Log2MaxIpcmCbSizeY ) | |
|           pcm_flag[ x0 ][ y0 ] | ae(v) |
|         if( pcm_flag[ x0 ][ y0 ] ) { | |
|           while( !byte_aligned( ) ) | |
|             pcm_alignment_zero_bit | ae(v) |
|           pcm_sample( x0, y0, log2CbSize ) | |
|         } else { | |
|           pbOffset = ( PartMode == PART_NxN ) ? ( nCbS / 2 ) : nCbS | |
|           for( j = 0; j < nCbS; j = j + pbOffset ) | |

Fig. 12a

| | |
|---|---|
| for( i = 0; i < nCbS; i = i + pbOffset ) | |
|     prev_intra_luma_pred_flag[ x0 + i ][ y0 + j ] | ae(v) |
| for( j = 0; j < nCbS; j = j + pbOffset ) | |
|   for( i = 0; i < nCbS; i = i + pbOffset ) | |
|     if( prev_intra_luma_pred_flag[ x0 + i ][ y0 + j ] ) | |
|       mpm_idx[ x0 + i ][ y0 + j ] | ae(v) |
|     else | |
|       rem_intra_luma_pred_mode[ x0 + i ][ y0 + j ] | ae(v) |
| if( ChromaArrayType == 3 ) | |
|   for( j = 0; j < nCbS; j = j + pbOffset ) | |
|     for( i = 0; i < nCbS; i = i + pbOffset ) | |
|       intra_chroma_pred_mode[ x0 + i ][ y0 + j ] | ae(v) |
| else if( ChromaArrayType != 0 ) | |
|   intra_chroma_pred_mode[ x0 ][ y0 ] | ae(v) |
| } | |
| if( additional_hypotheseis_enabled ) { | |
|   hyp = 0 | |
|   readMore = 1 | |
|   while( hyp < MaxNumAdditionalHypotheseis && readMore ) { ← 209 | |
|     additional_hypothesis_flag[ x0 ][ y0 ][ hyp ]  ← 210 | ae(v) |
|     if( additional_hypothesis_flag[ x0 ][ y0 ][ hyp ] ) { | |
|       add_pred_mode_flag[ x0 ][ y0 ][ hyp ]  ← 220 | ae(v) |
|       if( add_pred_mode_flag [ x0 ][ y0 ][ hyp ] ) { | |
|         pbOffset = ( PartMode == PART_NxN ) ? ( nCbS / 2 ) : nCbS | |
|         for( j = 0; j < nCbS; j = j + pbOffset ) | |
|           for( i = 0; i < nCbS; i = i + pbOffset ) | |
|             add_prev_intra_luma_pred_flag[ x0 + i ][ y0 + j ][ hyp ] | ae(v) |
|         for( j = 0; j < nCbS; j = j + pbOffset ) | |
|           for( i = 0; i < nCbS; i = i + pbOffset ) | |
|             if( prev_intra_luma_pred_flag[ x0 + i ][ y0 + j ] ) | |
|               add_mpm_idx[ x0 + i ][ y0 + j ][ hyp ] | ae(v) |
|             else | |
|               add_rem_intra_luma_pred_mode[ x0 + i ][ y0 + j ][ hyp ] | ae(v) |
|         if( ChromaArrayType == 3 ) | |

(222 brace encompasses the inner for-loop block)

Fig. 12b

| | |
|---|---|
| for( j = 0; j < nCbS; j = j + pbOffset ) | |
| for( i = 0; i < nCbS; i = i + pbOffset ) | |
| add_intra_chroma_pred_mode[ x0 + i ][ y0 + j ][ hyp ] | ae(v) |
| else if( ChromaArrayType != 0 ) | |
| add_intra_chroma_pred_mode[ x0 ][ y0 ][ hyp ] | ae(v) |
| 218 — add_hyp_intra_weight_idx[ x0 ][ y0 ][ hyp ] | ae(v) |
| 212 — } else { | |
| 214 — ref_idx_add_hyp[ x0 ][ y0 ][ hyp ] | ae(v) |
| 216 — mvd_coding( x0, y0, 2+hyp ) | |
| 218 — mvp_add_hyp_flag[ x0 ][ y0 ][ hyp ] | ae(v) |
| add_hyp_inter_weight_idx[ x0 ][ y0 ][ hyp ] | ae(v) |
| } | |
| } | |
| readMore = additional_hypothesis_flag[ x0 ][ y0 ][ hyp ] | |
| hyp++ | |
| } | |
| } | |
| } else { | |
| if( PartMode == PART_2Nx2N) | |
| prediction_unit( x0, y0, nCbS, nCbS ) | |
| else if( PartMode == PART_2NxN ) { | |
| prediction_unit( x0, y0, nCbS, nCbS / 2 ) | |
| prediction_unit( x0, y0 + ( nCbS / 2 ), nCbS, nCbS / 2 ) | |
| } else if( PartMode == PART_Nx2N ) { | |
| prediction_unit( x0, y0, nCbS / 2, nCbS ) | |
| prediction_unit( x0 + ( nCbS / 2 ), y0, nCbS / 2, nCbS ) | |
| } else if( PartMode == PART_2NxnU ) { | |
| prediction_unit( x0, y0, nCbS, nCbS / 4 ) | |
| prediction_unit( x0, y0 + ( nCbS / 4 ), nCbS, nCbS * 3 / 4 ) | |
| } else if( PartMode == PART_2NxnD ) { | |
| prediction_unit( x0, y0, nCbS, nCbS * 3 / 4 ) | |
| prediction_unit( x0, y0 + ( nCbS * 3 / 4 ), nCbS, nCbS / 4 ) | |

Fig. 12c

| | |
|---|---|
| } else if( PartMode == PART_nLx2N ) { | |
|   prediction_unit( x0, y0, nCbS / 4, nCbS ) | |
|   prediction_unit( x0 + ( nCbS / 4 ), y0, nCbS * 3 / 4, nCbS ) | |
| } else if( PartMode == PART_nRx2N ) { | |
|   prediction_unit( x0, y0, nCbS * 3 / 4, nCbS ) | |
|   prediction_unit( x0 + ( nCbS * 3 / 4 ), y0, nCbS / 4, nCbS ) | |
| } else { /* PART_NxN */ | |
|   prediction_unit( x0, y0, nCbS / 2, nCbS / 2 ) | |
|   prediction_unit( x0 + ( nCbS / 2 ), y0, nCbS / 2, nCbS / 2 ) | |
|   prediction_unit( x0, y0 + ( nCbS / 2 ), nCbS / 2, nCbS / 2 ) | |
|   prediction_unit( x0 + ( nCbS / 2 ), y0 + ( nCbS / 2 ), nCbS / 2, nCbS /) | |
|   } | |
| } | |
| if( !pcm_flag[ x0 ][ y0 ] ) { | |
|   if( CuPredMode[ x0 ][ y0 ] != MODE_INTRA && | |
|   !( PartMode == PART_2Nx2N && merge_flag[ x0 ][ y0 ] ) ) | |
|     rqt_root_cbf | ae(v) |
|   if( rqt_root_cbf ) { | |
|     MaxTrafoDepth = ( CuPredMode[ x0 ][ y0 ] == MODE_INTRA ? | |
|     ( max_transform_hierarchy_depth_intra + IntraSplitFlag ) : | |
|     max_transform_hierarchy_depth_inter ) | |
|     transform_tree( x0, y0, x0, y0, log2CbSize, 0, 0 ) | |
|   } | |
| } | |
| } | |
| } | |
| } | |

Fig. 12d

| | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( slice_type = = B ) { | |
|         restricted_merge_flag[ x0 ][ y0 ] | ae(v) |
|         if( restricted_merge_flag[ x0 ][ y0 ] ) | |
|           restricted_merge_list[ x0 ][ y0 ] | ae(v) |
|       } | |
|       if( MaxNumMergeCand > 1 ) | |
|         merge_idx[ x0 ][ y0 ] | ae(v) |
|     } else { | |
|       if( slice_type = = B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |

Fig. 13a

| | |
|---|---|
| if( inter_pred_idc[ x0 ][ y0 ] != PRED_L0 ) { | |
|   if( num_ref_idx_l1_active_minus1 > 0 ) | |
|     ref_idx_l1[ x0 ][ y0 ] | ae(v) |
|   if( mvd_l1_zero_flag && inter_pred_idc[ x0 ][ y0 ] == PRED_BI ) { | |
|     MvdL1[ x0 ][ y0 ][ 0 ] = 0 | |
|     MvdL1[ x0 ][ y0 ][ 1 ] = 0 | |
|   } else | |
|     mvd_coding(x0, y0, 1) | |
|   mvp_l1_flag[ x0 ][ y0 ] | ae(v) |
| } | |
| hyp = 0 | |
| readMore = 1 | |
| while( hyp < MaxNumAdditionalHypotheseis && readMore ) { | |
|   additional_hypothesis_flag[ x0 ][ y0 ][ hyp ] | ae(v) |
|   if( additional_hypothesis_flag[ x0 ][ y0 ][ hyp ] ) { | |
|     add_pred_mode_flag[ x0 ][ y0 ][ hyp ] | ae(v) |
|     if( add_pred_mode_flag[ x0 ][ y0 ][ hyp ] ) { | |
|       pbOffset = ( PartMode == PART_NxN ) ? ( nCbS / 2 ) : nCbS | |
|       for( j = 0; j < nCbS; j = j + pbOffset ) | |
|         for( i = 0; i < nCbS; i = i + pbOffset ) | |
|           add_prev_intra_luma_pred_flag[ x0 + i ][ y0 + j ][ hyp ] | ae(v) |
|       for( j = 0; j < nCbS; j = j + pbOffset ) | |

209 → (points to while line)
210 → (points to additional_hypothesis_flag)
220 → (points to add_pred_mode_flag)

Fig. 13b

| | |
|---|---|
| for( i = 0; i < nCbS; i = i + pbOffset ) | |
|   if( prev_intra_luma_pred_flag[ x0 + i ][ y0 + j ] ) | |
|     add_mpm_idx[ x0 + i ][ y0 + j ][ hyp ] | ae(v) |
|   else | |
|     add_rem_intra_luma_pred_mode[ x0 + i ][ y0 + j ][ hyp ] | ae(v) |
| if( ChromaArrayType == 3 ) | |
|   for( j = 0; j < nCbS; j = j + pbOffset ) | |
|     add_intra_chroma_pred_mode[ x0 + i ][ y0 + j ][ hyp ] | ae(v) |
| else if( ChromaArrayType != 0 ) | |
|   add_intra_chroma_pred_mode[ x0 ][ y0 ][ hyp ] | ae(v) |
|   add_hyp_intra_weight_idx[ x0 ][ y0 ][ hyp ] | ae(v) |
| } else { | |
|   ref_idx_add_hyp[ x0 ][ y0 ][ hyp ] | ae(v) |
|   mvd_coding( x0, y0, 2+hyp ) | |
|   mvp_add_hyp_flag[ x0 ][ y0 ][ hyp ] | ae(v) |
|   add_hyp_inter_weight_idx[ x0 ][ y0 ][ hyp ] | ae(v) |
| } | |
| readMore = additional_hypothesis_flag[ x0 ][ y0 ][ hyp ] | |
| hyp++ | |
| } | |
| } | |

Fig. 13c

COMPOSED PREDICTION AND RESTRICTED MERGE

CROSS-REFERENCE TO RELATED APPLICATIONS

This application is a continuation of U.S. application Ser. No. 17/002,578 filed Aug. 25, 2020, which is a continuation of International Application No. PCT/EP2019/054896 filed Feb. 27, 2019, which claims priority to European Application No. 18159304.7 filed Feb. 28, 2018, all of which are incorporated herein by reference in their entirety.

The present application is concerned with video coding/decoding.

BACKGROUND OF THE INVENTION

All relevant video coding standards, like AVC/H.264 or HEVC/H.265, follow the so-called hybrid approach, where predictive coding is combined with transform coding of the prediction residual. For generating the prediction signal, two possible modes are supported by these standards, namely INTRA prediction and INTER prediction. In AVC/H.264, the decision between these two modes can be made at macroblock (16×16 luma samples) level, and in HEVC/H.265 at Coding Unit (CU) level, which can be of varying size. In INTRA prediction, sample values of already reconstructed neighboring blocks of the current block can be used for generating the prediction signal. How this INTRA prediction signal is formed from the neighboring reconstructed sample values, is specified by the INTRA prediction mode. In INTER prediction, already reconstructed frames (in coding order) can be used for generating the prediction signal. For INTER prediction, in both AVC/H.264 and HEVC/H.265, either uni or bi prediction is used. For uni prediction, the prediction signal is a shifted and interpolated region of a so-called reference picture. The used reference picture is specified by the reference index and the location of the (possibly interpolated) region within the reference picture is specified (relatively to the current block) by the motion vector. The motion vector itself is predictively encoded relatively to a motion vector predictor, such that only the motion vector difference has to be actually encoded. In HEVC/H.265, the motion vector predictor is selected by transmitting a motion vector predictor index. In both AVC/H.264 and HEVC/H.265, motion vectors can be specified with an accuracy of a quarter pel (qpel). The process of generating such an (interpolated) prediction signal is also called motion-compensated prediction. In bi prediction, two motion-compensated prediction signals are linearly superposed (typically using a factor of 0.5 for both constituent prediction signals). Therefore, for bi-prediction two reference indices and motion vector differences (and motion vector predictor indices, in HEVC/H.265) have to be transmitted.

In order to simplify the encoding of contiguous areas having the same motion characteristics, HEVC/H.265 supports the so-called MERGE mode, where prediction parameters (i.e., reference indices and motion vectors) of either locally neighboring or temporally co-located blocks can be re-used for the current block. The SKIP mode of HEVC/H.265 is a particular case of MERGE, where no prediction residual is transmitted.

Although the available and supported prediction modes of now a days video codecs are already pretty effective in terms of keeping the prediction residual low at a reasonable amount of prediction side information needed in order to control the prediction using these prediction modes, it would be favorable to further increase the coding efficiency of block-based predictive video codecs.

SUMMARY

An embodiment may have a video decoder for decoding a video from a data stream using block-based predictive decoding, the video decoder supporting a set of primitive prediction modes for predicting blocks of a picture of the video, configured to predict a predetermined block by a composed prediction signal by deriving, using a collection of one or more primitive prediction modes out of the set of primitive prediction modes, a collection of one or more primitive predictions for the predetermined block, and composing the composed prediction signal for the predetermined block by combining the collection of one or more primitive predictions.

Another embodiment may have a video encoder for encoding a video into a data stream using block-based predictive coding, the video encoder supporting a set of primitive prediction modes for predicting blocks of a picture of the video, configured to predict a predetermined block by a composed prediction signal by deriving, using a collection of one or more prediction modes out of the set of prediction modes, a collection of primitive predictions for the predetermined block, and composing the composed prediction signal for the predetermined block by combining the collection of primitive predictions.

Another embodiment may have a video decoder for decoding a video from a data stream using block-based predictive decoding, configured to, for a predetermined block, read first prediction information from the data stream, determine, based on the first prediction information, a first prediction signal ($p_1$), derive a number K from the data stream, determining K further prediction signals ($p_2 \ldots p_{K+1}$) and for each of the K further prediction signals, a composition weight, predict the predetermined block based on the first prediction signal and the K further prediction signals and the composition weights therefor.

Another embodiment may have a video encoder for encoding a video into a data stream using block-based predictive coding, configured to, for a predetermined block, insert first prediction information into the data stream, determine, based on the first prediction information, a first prediction signal, determining K further prediction signals and for each of the K further prediction signals, a composition weight, and signal K in the data stream, predict the predetermined block based on the first prediction signal and the K further prediction signals and the composition weights therefor.

Another embodiment may have a video decoder for decoding a video from a data stream using block-based predictive decoding, configured to, for a predetermined block for which a merge mode is activated, read a merge candidate restriction signaling from the data stream, determine a set of prediction parameter merge candidates for the predetermined block with excluding from the set of prediction parameter merge candidates uni-predictive prediction parameter merge candidates if the merge candidate restriction signaling indicates a merge candidate restriction to bi-predictive prediction parameter merge candidates and admitting uni-predictive prediction parameter merge candidates to the set of prediction parameter merge candidates if the merge candidate restriction signaling does not indicate the merge candidate restriction to bi-predictive prediction parameter merge candidates, select one of the set of prediction parameter merge candidates for the predetermined block, if the merge candidate restriction signaling indicates the merge candidate restriction to bi-predictive prediction parameter merge candidates, read from the data stream a hypothesis selection indication; and determine a prediction signal for the predetermined block by using uni-predictive prediction parameterized according to one of two hypotheses of the selected prediction parameter merge candidate, the one hypothesis being selected according to the hypothesis selection indication, if the merge candidate restriction signaling indicates the merge candidate restriction to bi-predictive prediction parameter merge candidates, and bi-predictive prediction parameterized according to the two hypotheses of the selected prediction parameter merge candidate, if the selected prediction parameter merge candidate is bi-predictive, and uni-predictive prediction parameterized according to the selected prediction parameter merge candidate if the selected prediction parameter merge candidate is uni-predictive, if the merge candidate restriction signaling does not indicate the merge candidate restriction to bi-predictive prediction parameter merge candidates.

Another embodiment may have a video encoder for encoding a video into a data stream using block-based predictive decoding, configured to, for a predetermined block for which a merge mode is activated, write a merge candidate restriction signaling into the data stream, determine a set of prediction parameter merge candidates for the predetermined block with excluding from the set of prediction parameter merge candidates uni-predictive prediction parameter merge candidates if the merge candidate restriction signaling indicates a merge candidate restriction to bi-predictive prediction parameter merge candidates and admitting uni-predictive prediction parameter merge candidates to the set of prediction parameter merge candidates if the merge candidate restriction signaling does not indicate the merge candidate restriction to bi-predictive prediction parameter merge candidates, select one of the set of prediction parameter merge candidates for the predetermined block, if the merge candidate restriction signaling indicates the merge candidate restriction to bi-predictive prediction parameter merge candidates, write into the data stream a hypothesis selection indication; and determine a prediction signal for the predetermined block by using uni-predictive prediction parameterized according to one of two hypotheses of the selected prediction parameter merge candidate, the one hypothesis being selected according to the hypothesis selection indication, if the merge candidate restriction signaling indicates the merge candidate restriction to bi-predictive prediction parameter merge candidates, and bi-predictive prediction parameterized according to the two hypotheses of the selected prediction parameter merge candidate, if the selected prediction parameter merge candidate is bi-predictive, and uni-predictive prediction parameterized according to the selected prediction parameter merge candidate if the selected prediction parameter merge candidate is uni-predictive, if the merge candidate restriction signaling does not indicate the merge candidate restriction to bi-predictive prediction parameter merge candidates.

Another embodiment may have a video decoder for decoding a video from a data stream using block-based predictive decoding, configured to, for a predetermined block for which a merge mode is activated, determine a set of prediction parameter merge candidates for the predetermined block, select one of the set of prediction parameter merge candidates for the predetermined block, read a merge candidate restriction signaling from the data stream, if the merge candidate restriction signaling indicates a restricted merge operation, read from the data stream a hypothesis selection indication; and determine a prediction signal for the predetermined block by using if the selected prediction parameter merge candidate is uni-predictive, uni-predictive prediction parameterized according to the selected prediction parameter merge candidate, if the selected prediction parameter merge candidate is bi-predictive, uni-predictive prediction parameterized according to one of two hypotheses of the selected prediction parameter merge candidate, the one hypothesis being selected according to the hypothesis selection indication, if the merge candidate restriction signaling indicates the restricted merge operation, and bi-predictive prediction parameterized according to the two hypotheses of the selected prediction parameter merge candidate, if the merge candidate restriction signaling does not indicate the restricted merge operation.

Another embodiment may have a video encoder for encoding a video into a data stream using block-based predictive decoding, configured to, for a predetermined block for which a merge mode is activated, determine a set of prediction parameter merge candidates for the predetermined block, select one of the set of prediction parameter merge candidates for the predetermined block, write a merge candidate restriction signaling into the data stream, if the merge candidate restriction signaling indicates a restricted merge operation, write into the data stream a hypothesis selection indication; and determine a prediction signal for the predetermined block by using if the selected prediction parameter merge candidate is uni-predictive, uni-predictive prediction parameterized according to the selected prediction parameter merge candidate, if the selected prediction parameter merge candidate is bi-predictive, uni-predictive prediction parameterized according to one of two hypotheses of the selected prediction parameter merge candidate, the one hypothesis being selected according to the hypothesis selection indication, if the merge candidate restriction signaling indicates the restricted merge operation, and bi-predictive prediction parameterized according to the two hypotheses of the selected prediction parameter merge candidate, if the merge candidate restriction signaling does not indicate the restricted merge operation.

Another embodiment may have a method for decoding a video from a data stream using block-based predictive decoding, the method supporting a set of primitive prediction modes for predicting blocks of a picture of the video, and including predicting a predetermined block by a composed prediction signal by deriving, using a collection of one or more primitive prediction modes out of the set of primitive prediction modes, a collection of primitive predictions for the predetermined block, and composing the composed prediction signal for the predetermined block by combining the collection of primitive predictions.

Another embodiment may have a method for encoding a video into a data stream using block-based predictive coding, the method supporting a set of primitive prediction modes for predicting blocks of a picture of the video, and including predicting a predetermined block by a composed prediction signal by deriving, using a collection of one or more prediction modes out of the set of prediction modes, a collection of primitive predictions for the predetermined block, and composing the composed prediction signal for the predetermined block by combining the collection of primitive predictions.

Another embodiment may have a method for decoding a video from a data stream using block-based predictive decoding, including, for a predetermined block, read first prediction information from the data stream, determine, based on the first prediction information, a first prediction signal ($p_1$), derive a number K from the data stream, determining K further prediction signals ($p_2 \ldots p_{K+1}$) and for each of the K further prediction signals, a composition weight, predict the predetermined block based on the first prediction signal and the K further prediction signals and the composition weights therefor.

Another embodiment may have a method for encoding a video into a data stream using block-based predictive coding, including, for a predetermined block, Insert first prediction information into the data stream, determine, based on the first prediction information, a first prediction signal, determining K further prediction signals and for each of the K further prediction signals, a composition weight, and signal K in the data stream, predict the predetermined block based on the first prediction signal and the K further prediction signals and the composition weights therefor.

Another embodiment may have a method for decoding a video from a data stream using block-based predictive decoding, including, for a predetermined block for which a merge mode is activated, read a merge candidate restriction signaling from the data stream, determine a set of prediction parameter merge candidates for the predetermined block with excluding from the set of prediction parameter merge candidates uni-predictive prediction parameter merge candidates if the merge candidate restriction signaling indicates a merge candidate restriction to bi-predictive prediction parameter merge candidates and admitting uni-predictive prediction parameter merge candidates to the set of prediction parameter merge candidates if the merge candidate restriction signaling does not indicate the merge candidate restriction to bi-predictive prediction parameter merge candidates, select one of the set of prediction parameter merge candidates for the predetermined block, if the merge candidate restriction signaling indicates the merge candidate restriction to bi-predictive prediction parameter merge candidates, read from the data stream a hypothesis selection indication; and determine a prediction signal for the predetermined block by using uni-predictive prediction parameterized according to one of two hypotheses of the selected prediction parameter merge candidate, the one hypothesis being selected according to the hypothesis selection indication, if the merge candidate restriction signaling indicates the merge candidate restriction to bi-predictive prediction parameter merge candidates, and bi-predictive prediction parameterized according to the two hypotheses of the selected prediction parameter merge candidate, if the selected prediction parameter merge candidate is bi-predictive, and uni-predictive prediction parameterized according to the selected prediction parameter merge candidate if the selected prediction parameter merge candidate is uni-predictive, if the merge candidate restriction signaling does not indicate the merge candidate restriction to bi-predictive prediction parameter merge candidates.

Another embodiment may have a method for encoding a video into a data stream using block-based predictive decoding, including, for a predetermined block for which a merge mode is activated, write a merge candidate restriction signaling into the data stream, determine a set of prediction parameter merge candidates for the predetermined block with excluding from the set of prediction parameter merge candidates uni-predictive prediction parameter merge candidates if the merge candidate restriction signaling indicates a merge candidate restriction to bi-predictive prediction parameter merge candidates and admitting uni-predictive prediction parameter merge candidates to the set of prediction parameter merge candidates if the merge candidate restriction signaling does not indicate the merge candidate restriction to bi-predictive prediction parameter merge candidates, select one of the set of prediction parameter merge candidates for the predetermined block, if the merge candidate restriction signaling indicates the merge candidate restriction to bi-predictive prediction parameter merge candidates, write into the data stream a hypothesis selection indication; and determine a prediction signal for the predetermined block by using uni-predictive prediction parameterized according to one of two hypotheses of the selected prediction parameter merge candidate, the one hypothesis being selected according to the hypothesis selection indication, if the merge candidate restriction signaling indicates the merge candidate restriction to bi-predictive prediction parameter merge candidates, and bi-predictive prediction parameterized according to the two hypotheses of the selected prediction parameter merge candidate, if the selected prediction parameter merge candidate is bi-predictive, and uni-predictive prediction parameterized according to the selected prediction parameter merge candidate if the selected prediction parameter merge candidate is uni-predictive, if the merge candidate restriction signaling does not indicate the merge candidate restriction to bi-predictive prediction parameter merge candidates.

Another embodiment may have a method for decoding a video from a data stream using block-based predictive decoding, including to, for a predetermined block for which a merge mode is activated, determine a set of prediction parameter merge candidates for the predetermined block, select one of the set of prediction parameter merge candidates for the predetermined block, read a merge candidate restriction signaling from the data stream, if the merge candidate restriction signaling indicates a restricted merge operation, read from the data stream a hypothesis selection indication; and determine a prediction signal for the predetermined block by using if the selected prediction parameter merge candidate is uni-predictive, uni-predictive prediction parameterized according to the selected prediction parameter merge candidate, if the selected prediction parameter merge candidate is bi-predictive, uni-predictive prediction parameterized according to one of two hypotheses of the selected prediction parameter merge candidate, the one hypothesis being selected according to the hypothesis selection indication, if the merge candidate restriction signaling indicates the restricted merge operation, and bi-predictive prediction parameterized according to the two hypotheses of the selected prediction parameter merge candidate, if the merge candidate restriction signaling does not indicate the restricted merge operation.

Another embodiment may have a method for encoding a video into a data stream using block-based predictive decoding, including, for a predetermined block for which a merge mode is activated, determine a set of prediction parameter merge candidates for the predetermined block, select one of the set of prediction parameter merge candidates for the predetermined block, write a merge candidate restriction signaling into the data stream, if the merge candidate restriction signaling indicates a restricted merge operation, write into the data stream a hypothesis selection indication; and determine a prediction signal for the predetermined block by using if the selected prediction parameter merge candidate is uni-predictive, uni-predictive prediction parameterized according to the selected prediction parameter merge candidate, if the selected prediction parameter merge candidate is bi-predictive, uni-predictive prediction parameterized according to one of two hypotheses of the selected prediction parameter merge candidate, the one hypothesis being selected according to the hypothesis selection indication, if the merge candidate restriction signaling indicates the restricted merge operation, and bi-predictive prediction parameterized according to the two hypotheses of the selected prediction parameter merge candidate, if the merge candidate restriction signaling does not indicate the restricted merge operation.

Another embodiment may have a non-transitory digital storage medium having a computer program stored thereon to perform the method for decoding a video from a data stream using block-based predictive decoding, the method including, for a predetermined block, read first prediction information from the data stream, determine, based on the first prediction information, a first prediction signal ($p_1$), derive a number K from the data stream, determining K further prediction signals ($p_2 \ldots p_{K+1}$) and for each of the K further prediction signals, a composition weight, predict the predetermined block based on the first prediction signal and the K further prediction signals and the composition weights therefor, when said computer program is run by a computer.

Another embodiment may have a data stream generated by any of the inventive methods for encoding.

It is basic idea underlying the present invention that a coding efficiency increase is achievable by using composed prediction signals to predict a predetermined block of a picture.

In accordance with an embodiment, the number of primitive predictions combined to result into the composition of the composed prediction signal is allowed to exceed two, or differently speaking, the number of further prediction signals beyond a first prediction signal on the basis of which, together with a first prediction signal, the predetermined block is finally predicted, may exceed one. The maximum number of prediction signals or primitive predictions contributing to the composed prediction signal may be limited by a default value or by some value signaled in the data stream. The possibility to allow for such a high number of contributing prediction signals or primitive predictions per composed prediction signal for a predetermined block offers the possibility of inherent noise reduction of the composed prediction signal by exploiting the mutual noise reduction of the independent noise components of the individual prediction contributions.

In accordance with embodiments of the present application, the number of contributing primitive predictions or combined prediction signals on the basis of which a predetermined block is predicted, i.e., the cardinality of the collection of primitive predictions on the basis of which the composed prediction signal is formed, is subject to a local variation at sub-picture granularity. The signaling overhead might be kept low by using spatial and/or temporal prediction in order to control the variation with or without using explicit information conveyed in the data stream in order to signal residual data for correcting the spatial and/or temporal prediction. Beyond this, the concept of merging blocks as used, for instance, in HEVC may be extended so as to not only relate to the first prediction signal or first primitive prediction contributing to the finally composed prediction signal, but also to the definition of further primitive predictions or further prediction signals. For instance, the number of contributing primitive predictions or prediction signals and their associated prediction parameters and prediction modes may be adopted from the merge candidate, thereby offering a further reduction in signaling overhead otherwise resulting from the increase in the number of contributing primitive predictions and prediction signals, respectively.

In accordance with embodiments of the present application, the manner at which the contributing primitive predictions or prediction signals are combined to result into the composed prediction signal is controlled by way of side information in the data stream. In particular, in accordance with certain embodiments of the present application, the individual primitive predictions or prediction signals are sequentially summed-up. To the first primitive prediction or first prediction signal, a second primitive prediction or first further prediction signal is added in order to form a first intermediate sum. For controlling this first summation, a contribution weight is signaled in the data stream for the predetermined block. In the summation, this contribution value is used to weight the addend formed by the current primitive prediction or further prediction signal, i.e., the second primitive prediction or first further prediction signal respectively, while one minus the contribution weight is used in order to weight the first primitive prediction or first prediction signal, respectively. Likewise, a second contribution value is transmitted for the predetermined block in order to control the summation of the third primitive prediction or second further prediction signal to the just-mentioned intermediate sum and so forth. The composition is, thus, also controlled at sub-picture granularity such as in units of the blocks themselves. In controlling the contributions in this manner, the side information overhead for controlling the compositions may be kept low. In particular, in accordance with embodiments of the present application, the contribution weights are selected by the encoder and signaled in the data stream using a discrete value domain of a discrete number of values each contribution weight may assume. For instance, this number of discrete weight values may be equal for the individual sequentially performed summations, i.e., for all contribution weights, and despite this limitation, a fine setting of the effective weight at which earlier primitive predictions or earlier further prediction signals contribute to the composed prediction signal may be achieved by way of the fact that this effective weight is actually formed by the product of not only the contribution value of these earlier primitive predictions or further prediction signals, but also the contribution weights of the subsequently added primitive predictions and further prediction signals, respectively. As to implementation, the computational overhead for performing the sequential adding may be kept low by subjecting at least some of the intermediate sums or some of the sequentially performed summation results to a clipping and/or rounding operation. As far as the encoder is concerned, favorably, the testing of the increased freedom in composing the prediction signals comes at a reasonable increase in computational overhead as the testing of the individual primitive predictions or prediction signals, respectively, is mostly already done in existing implementations of the encoders so that the sequential summation results merely in a reasonable increase in encoder overhead compared to the coding efficiency increase offered by the new freedom in composing prediction signals.

In accordance with a further aspect of the present application, used in combination with above concepts or independent therefrom, merging is allowed to be controllable by syntax in the data stream. A merge candidate restriction signaling may activate a restriction of merge candidate set construction to bi-predictive prediction parameter merge candidates, and if so, a hypothesis selection indication is added to select one of the hypotheses of a finally selected prediction parameter merge candidate. Alternatively, a merge candidate restriction signaling may activate a restricted merge, and if so, a hypothesis selection indication is added to select one of the hypotheses of a finally selected prediction parameter merge candidate. Here, the construction admits both uni- and bi-predictive candidates to the set, but it a bi predictive one is selected, merely the selected hypothesis is used for a uni-predictive handling of the current block. By this manner, the merge concept is rendered more effective by adding merely a reasonable amount of side information for adapting the merge procedure.

BRIEF DESCRIPTION OF THE DRAWINGS

Embodiments of the present invention will be detailed subsequently referring to the appended drawings, in which:

FIG. 9 shows an example for a prediction unit syntax signaling further primitive predictions which are, inevitably, inter-mode ones, with the example illustrating that a number of implicitly defined further primitive predictions might have been derived from a merge candidate;

FIG. 10 shows a syntax example for a prediction unit syntax differing from FIG. 9 in that no implicitly defined further primitive prediction is provided;

FIG. 11a-b shows a syntax example for a prediction unit syntax where, in addition to the example of FIG. 10, additional syntax is spent in order allow for a merely partial inheritance of hypothesis for a B-predictive first primitive prediction;

FIG. 12a-d shows a syntax example for a coding unit syntax which illustrates that the concept of composed prediction may also be applied to blocks for which the first prediction is of an intra prediction mode, and which additionally illustrates that the further primitive predictions signaled may be of either intra prediction mode or inter prediction mode with the selection being signaled in the data stream; and FIG. 13a-c shows an example syntax for the prediction unit syntax called by the CU syntax of FIG. 12a-d with illustrating that also for inter predicted blocks, the further primitive predictions may be of a signaled one of intra prediction and inter prediction mode.

DETAILED DESCRIPTION OF THE INVENTION

The following description of the figures starts with a presentation of a description of video encoder and video decoder of a block-based predictive codec for coding pictures of a video in order to form an example for a coding framework into which embodiments for an composed prediction codec may be built in. The video encoder and video decoder are described with respect to FIGS. 1 to 3. Thereinafter the description of embodiments of the composed prediction concept of the present application are presented along with a description as to how such concepts could be built into the video encoder and decoder of FIGS. 1 and 2, respectively, although the embodiments described with the subsequent FIG. 4 and following, may also be used to form video encoder and video decoders not operating according to the coding framework underlying the video encoder and video decoder of FIGS. 1 and 2.

Figure 1:
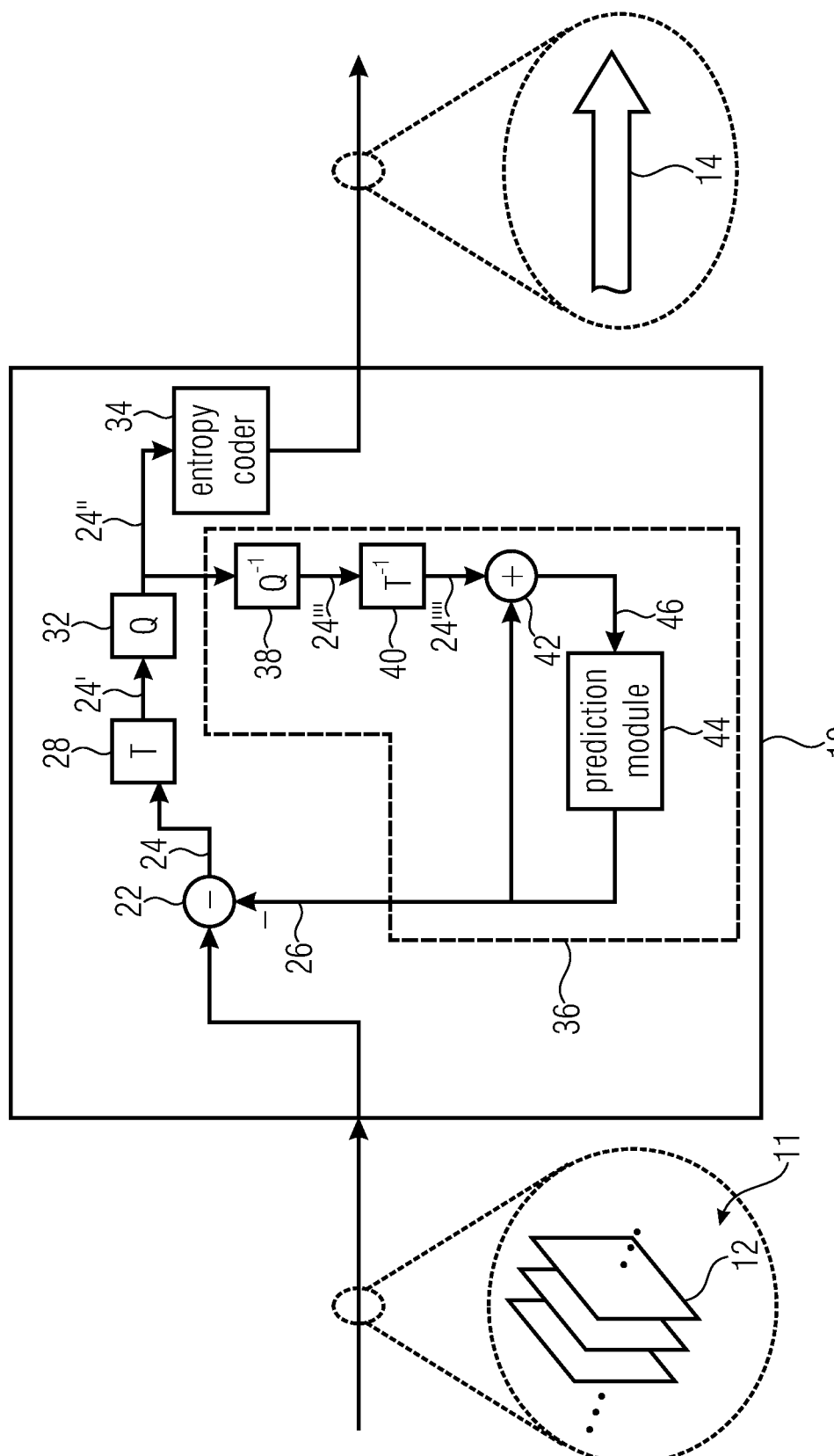
FIG. 1 shows a block diagram of an apparatus for predictively coding a video as an example for a video decoder where a composed prediction concept according to embodiments of the present application could be implemented.
Figure 2:
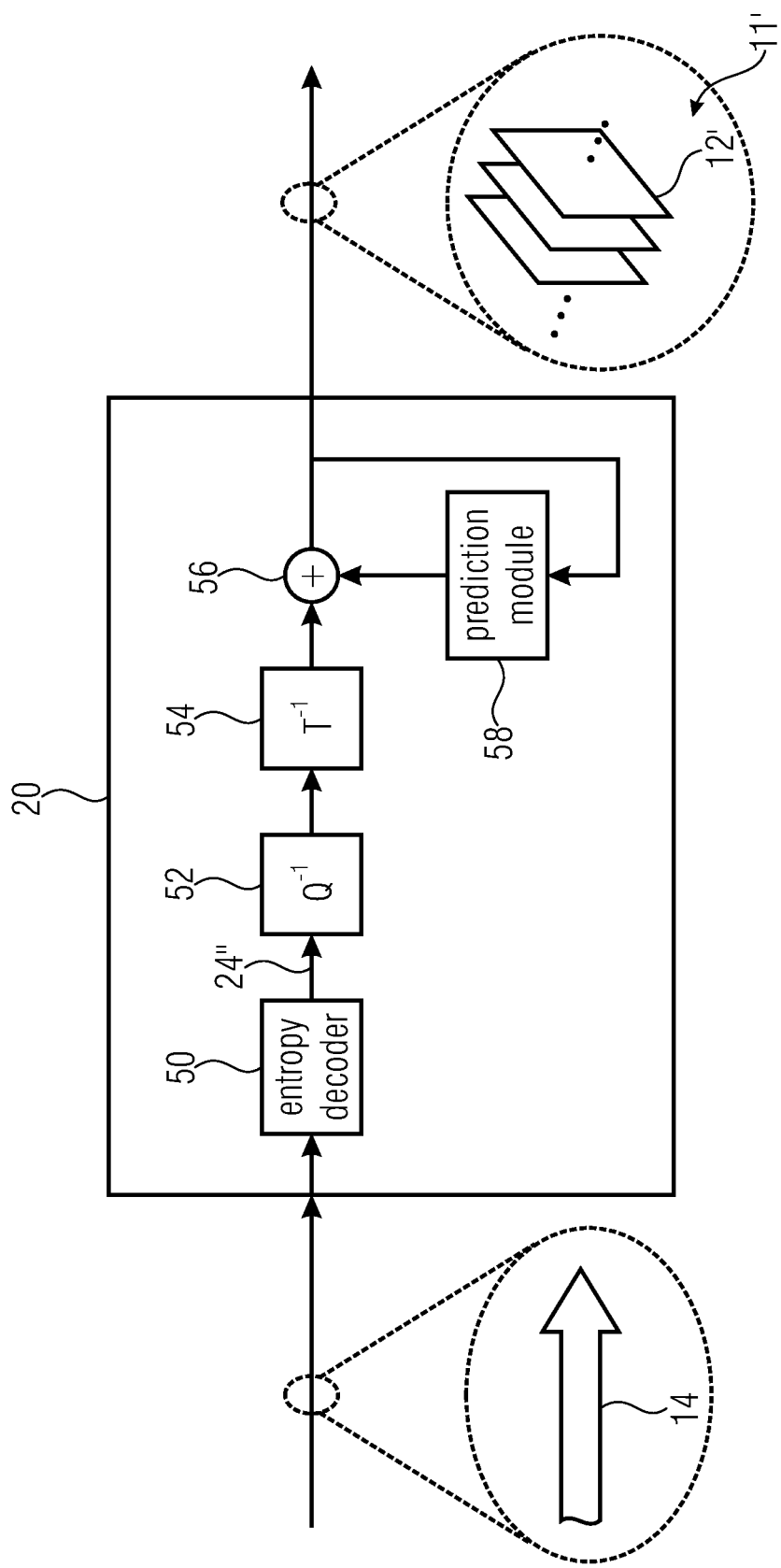
FIG. 2 shows a block diagram of an apparatus for predictively decoding a video, which fits to the apparatus of FIG. 1, as an example for a video decoder where a composed prediction concept according to embodiments of the present application could be implemented.

FIG. 1 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10. FIG. 2 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24"', which corresponds to signal 24' except for quantization loss, followed by an inverse transformer 40 which subjects the latter prediction residual signal 24"' to an inverse transformation, i.e. a spectral-to-spatial transformation, to obtain prediction residual signal 24"", which corresponds to the original prediction residual signal 24 except for quantization loss. A combiner 42 of the prediction stage 36 then recombines, such as by addition, the prediction signal 26 and the prediction residual signal 24"" so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra prediction, and/or temporal prediction, i.e. inter prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes which form a kind of set or pool of primitive prediction modes based on which the predictions of picture blocks are composed in a manner described in more detail below. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter. According to intra-coding mode, a prediction signal for a block is obtained on the basis of a spatial, already coded/decoded neighborhood of the respective block. Several intra-coding sub-modes may exist the selection among which, quasi, represents a kind of intra prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24", data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signaling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Figure 3:
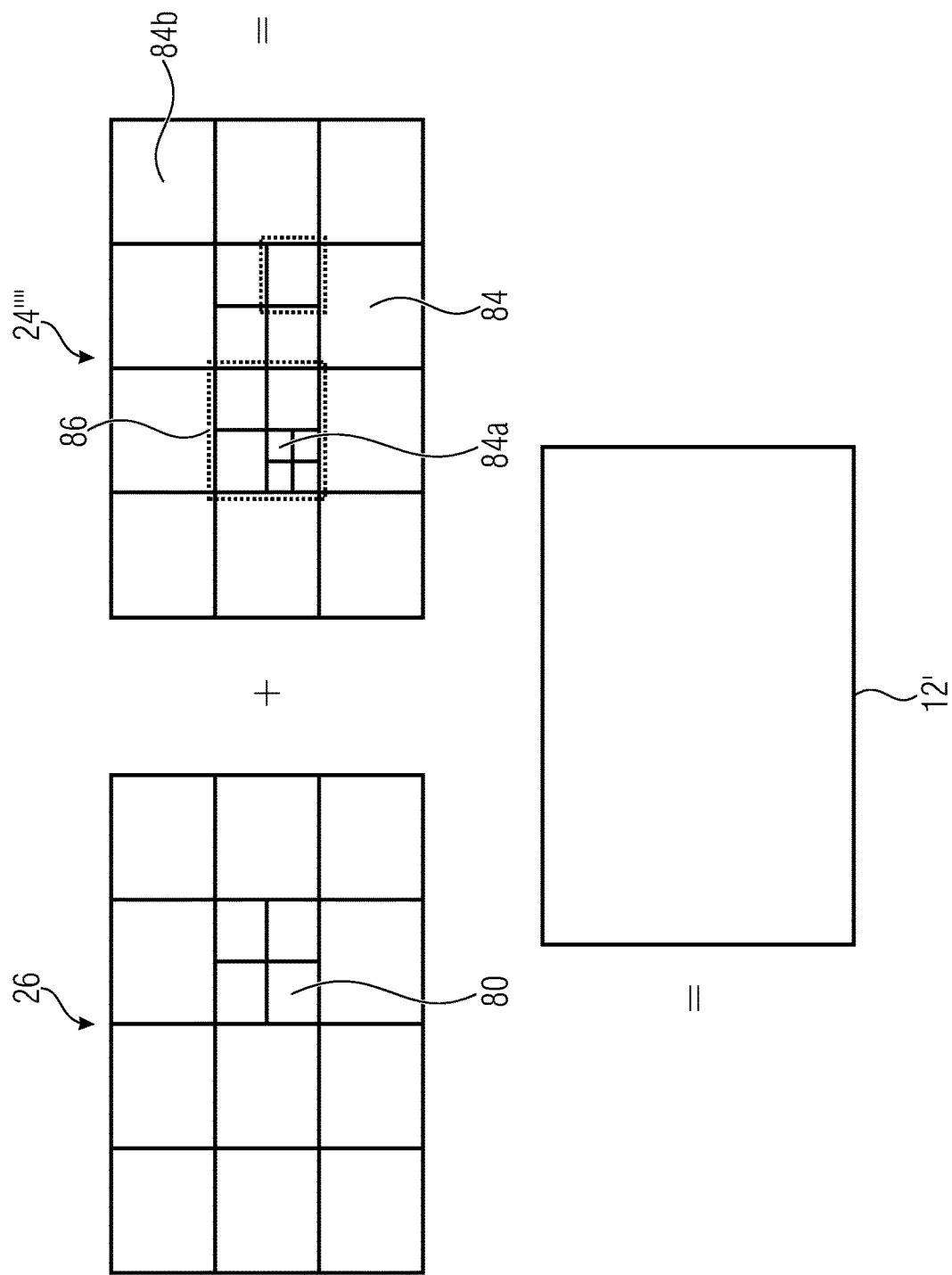
FIG. 3 shows a schematic diagram illustrating an example for a relationship between a prediction residual signal, a prediction signal and a reconstructed signal so as to illustrate possibilities of setting subdivisions for defining the prediction signal, handling the prediction residual signal and the like, respectively.

FIG. 3 illustrates the relationship between the reconstructed signal, i.e. the reconstructed picture 12', on the one hand, and the combination of the prediction residual signal 24"" as signaled in the data stream, and the prediction signal 26, on the other hand. As already denoted above, the combination may be an addition. The prediction signal 26 is illustrated in FIG. 3 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 3 where the picture area is firstly subdivided into rows and columns of tree-root blocks which are then further subdivided in accordance with a recursive multi-tree subdivisioning to result into blocks 80.

The prediction residual signal 24"" in FIG. 3 is also illustrated as a subdivision of the picture area into blocks 84. These blocks might be called transform blocks in order to distinguish same from the coding blocks 80. In effect, FIG. 3 illustrates that encoder 10 and decoder 20 may use two different subdivisions of picture 12 and picture 12', respectively, into blocks, namely one subdivisioning into coding blocks 80 and another subdivision into blocks 84. Both subdivisions might be the same, i.e. each block 80, may concurrently form a transform block 84 and vice versa, but FIG. 3 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not be the only subdivision used for coding/decoding. These subdivision from a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters, prediction signal composition control signals and the like.

FIG. 3 illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments such as prediction signals obtained from other views or from other coding layers which are coded/decoded in a separate prediction loop with separate DPB, for instance.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

In any case, it should be noted that the set of supported transforms may comprise merely one transform such as one spectral-to-spatial or spatial-to-spectral transform.

As already outlined above, FIGS. 1-3 have been presented as an example where the composed-prediction concept described further below may be implemented in order to form specific examples for video encoders and decoders according to the present application. Insofar, the video encoder and decoder of FIGS. 1 and 2, respectively, represent possible implementations of the video encoders and decoders described herein below. As will be outlined in more detail below, when having the subsequently explained embodiments for composed prediction according to the present application built into the video encoder and decoder of FIGS. 1 and 2, the video encoder of FIG. 1 and the video decoder of FIG. 2 support, at least as one option, to process a block 80 in the manner outlined in more detail below, or even all blocks a current picture 12 is composed of. Thus, the embodiments described hereinafter, inter alias, refer to a video encoder which equals the encoder 10 of FIG. 1 which treats blocks 80 in the manner outlined in more detail below and the same applies with respect to the decoder of FIG. 2 which, thus, represents an example for a video decoder according to an embodiment where blocks 80 are treated in the manner outlined in more detail below. FIGS. 1 and 2 are, however, only specific examples. A video encoder according to embodiments of the present application may, however, perform block-based encoding using the concept outlined in more detail below and being different from the encoder of FIG. 1 such as, for instance, in that the sub-division into blocks 80 is performed in a manner different than exemplified in FIG. 3, or in that this encoder does not use transform prediction residual coding with coding the prediction residual, for instance, in spatial domain directly instead. Likewise, video decoders according to embodiments of the present application may perform decoding from data stream 14 using the composed-prediction coding concept further outlined below, but may differ, for instance, from the decoder 20 of FIG. 2 in that sub-divides picture 12' into blocks in a manner different than described with respect to FIG. 3 and/or in that same does not derive the prediction residual from the data stream 14 in transform domain, but in spatial domain, for instance.

In particular, with respect to the block-subdivisioning into blocks 80, it is noted that same may be done in the manner outlined with respect to FIG. 3 or in a different manner. A subdivisioning into transform blocks, if present, may also be done as described with respect to FIG. 3 or in a different manner. In particular, the subdivisioning into blocks on the one hand and into other blocks on the other hand, such as transform blocks, may be done independent from each other by separately subdividing picture 12 into these blocks, respectively, or in a dependent manner. For instance, one subdivision such as the subdivision into transform blocks, may form an extension of the other subdivision as described above, or both subdivisions may form separate extensions of a common primary subdivision such as, for instance, the subdivision of the picture into an array of tree root blocks as described with respect to FIG. 3. And such possibilities also apply for other sub-picture granularities which will be mentioned below such as with respect to the definition of certain prediction parameters, prediction modes, contribution weights or the like. Different subdivisions may be used for different ones of these entities and same may be defined independent from each other, partially independent or as extensions from one another.

Having said this, the following description concentrates on predicting blocks 80 at encoder and decoder. The aim is to improve the rate distortion performance of video coding, by replacing the traditional hard distinction between INTRA, INTER uni, and INTER bi prediction with a more general approach, which allows greater flexibility in the way the prediction signal is obtained. The idea is to compose a number of primitive prediction operations such that the composition results in a better prediction signal than any of its constituent primitive prediction operations. In a simple case, the constituent primitive prediction operations could be either INTRA prediction or INTER prediction (uni or bi), and the composition operation could be weighted superposition. In this case, the resulting overall prediction signal q would be derived from the constituent primitive prediction signals $p_1, \ldots, p_N$ as $q = \sum_{n=1}^{N} \alpha_n \cdot p_n$ with $\alpha_n$ being a weighting factor and N being the number of constituent primitive predictions. Here and in the following, $p_1, \ldots, p_N$ and q are vectors consisting of the sample values of the corresponding signals namely two-dimensional vectors of the shape of the block to be predicted.

In a particular embodiment, the overall prediction signal is obtained by repeated application of composition operations. We define the initialization $$q_1 = p_1, v_1 = 1$$

and the recurrence relation $$q_{n+1} = f_n(q_n, p_{v_n+1}, \ldots, p_{v_{n+1}}).$$

The composition operator $f_n$ maps an intermediate composed prediction signal $q_n$ and one or more primitive prediction signals $p_{v_n+1}, \ldots p_{v_{n+1}}$ to a new intermediate prediction signal $q_{n+1}$. The values of $v_n+1$ and $v_{n+1}$ specify the indices of the first and the last primitive prediction signals which are used for generating the intermediate prediction signal $q_{n+1}$. The overall prediction signal is obtained as the final intermediate prediction signal $q = q_{K+1}$. Note that, K specifies the number of composition operations applied. It may be, e.g., that K≥0, K≥1 or K>1 and an upper limit such as 1 o 2 may apply as well. With the total number of constituent primitive prediction signals given as N, it follows $v_{K+1} = N$.

Figure 4:
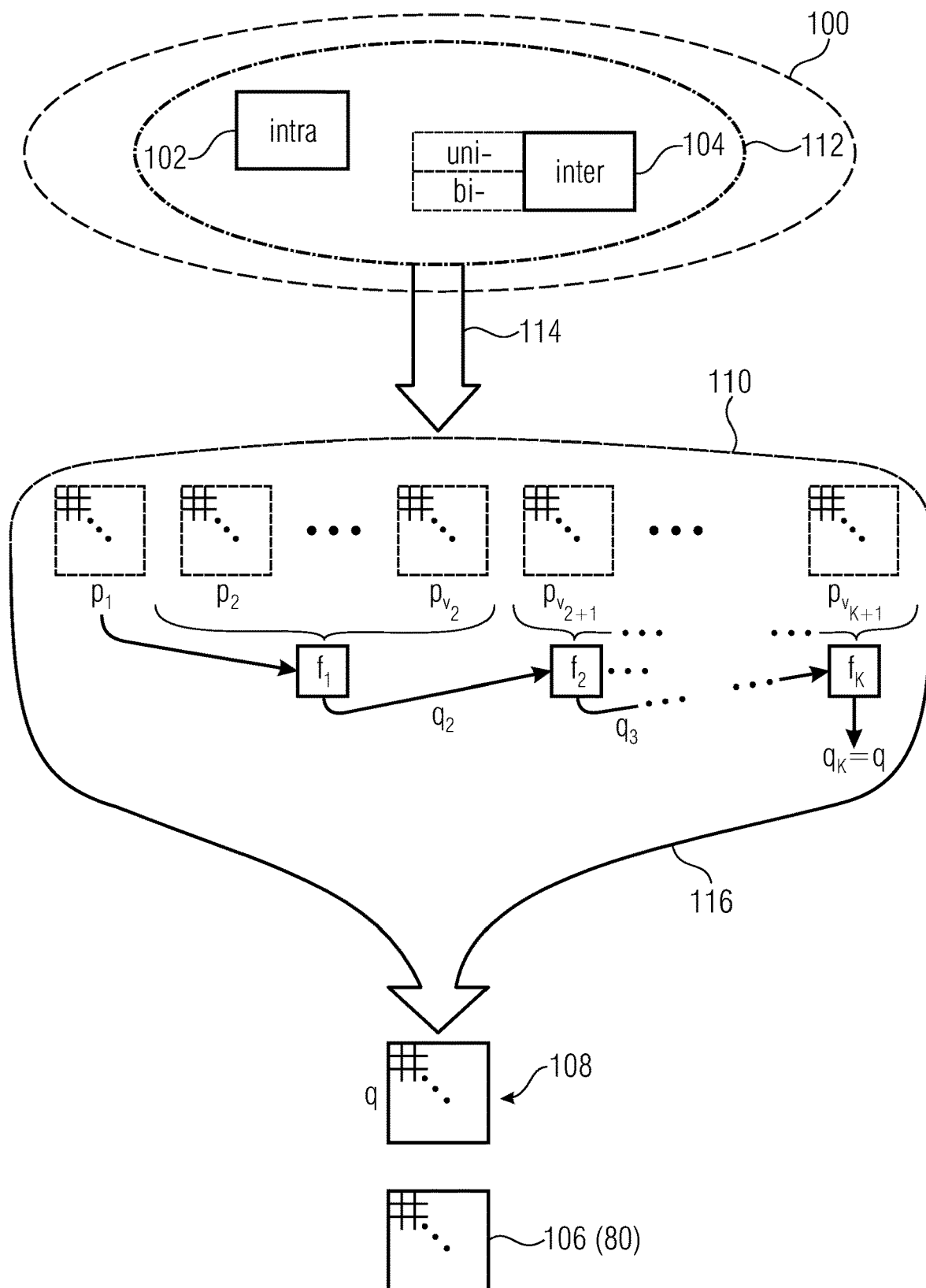
FIG. 4 shows a schematic diagram illustrating the composition of a prediction signal in accordance with an embodiment using an iterative approach or a recurrence relation, respectively.

In order to illustrate this further, please see FIG. 4. The set of primitive prediction modes supported by decoder and encoder are illustrated at 100. This set 100 may comprise intra prediction mode 102 and inter prediction mode 104. Uni-predictive inter prediction mode and bi-predictive inter prediction mode may form separate elements of set 100 or may be interpreted as differently parameterized versions of the inter prediction mode 104 as illustrated by dotted lines in FIG. 4. The block currently to be predicted is indicated at 106. In order to form the composed prediction signal q, 108, for predetermined block 106, decoder and encoder provide a collection 110 of primitive predictions, namely $p_1$ to $p_{v_{K+1}}$. Encoder and decoder derive this collection 110 using the set 100 of prediction modes or, to be more precise, a collection 112 of primitive prediction modes out of set 100, wherein this collection 112 may be equal to set 100 or may be a proper subset thereof depending on the association of the individual primitive predictions $p_i$ to the prediction modes in set 100. In particular, for the derivation 114 of the primitive prediction collection 110, each primitive prediction $p_i$ may be derived by an associated one of the prediction modes of set 100 and all prediction modes thus associated to at least one of the primitive predictions in collection 110 form collection 112. Based on the collection of primitive predictions, i.e., 110, decoder and encoder then compose the composed prediction signal 108 for the predetermined block 106 by combining the collection 110 of primitive predictions. As indicated by way of the last formula, this combination 116 may be done in stages or sequentially in iterations. The number of iterations has been indicated above by way of K. In particular, the first primitive prediction $p_1$, which somehow forms a usual or base prediction, is firstly combined by way of function $f_1$ with a first subset of further primitive predictions, namely $p_2, \ldots, p_{v_2}$ so as to obtain intermediate prediction signal $q_2$. The latter is then subject to another function $f_2$ along with a further subset of the further primitive predictions, namely $p_{v_2+1} \ldots p_{v_3}$ so as to result into intermediate prediction signal $q_3$ and so forth with the result of function $f_K$ yielding the final composed prediction signal 108, i.e., q.

As illustrated in FIG. 4, each primitive prediction $p_i$ and the composed prediction signal q and all the intermediate prediction signals $q_i$ represent vectors or matrices associating a predicted sample value to each sample position of block 106. As explained above with respect to FIGS. 1 and 2, the encoder encodes a prediction residual for block 106 into the data stream 14, namely relative to the composed prediction signal 108 for correcting the composed prediction signal 108 so as to reconstruct block 106.

Figure 5:
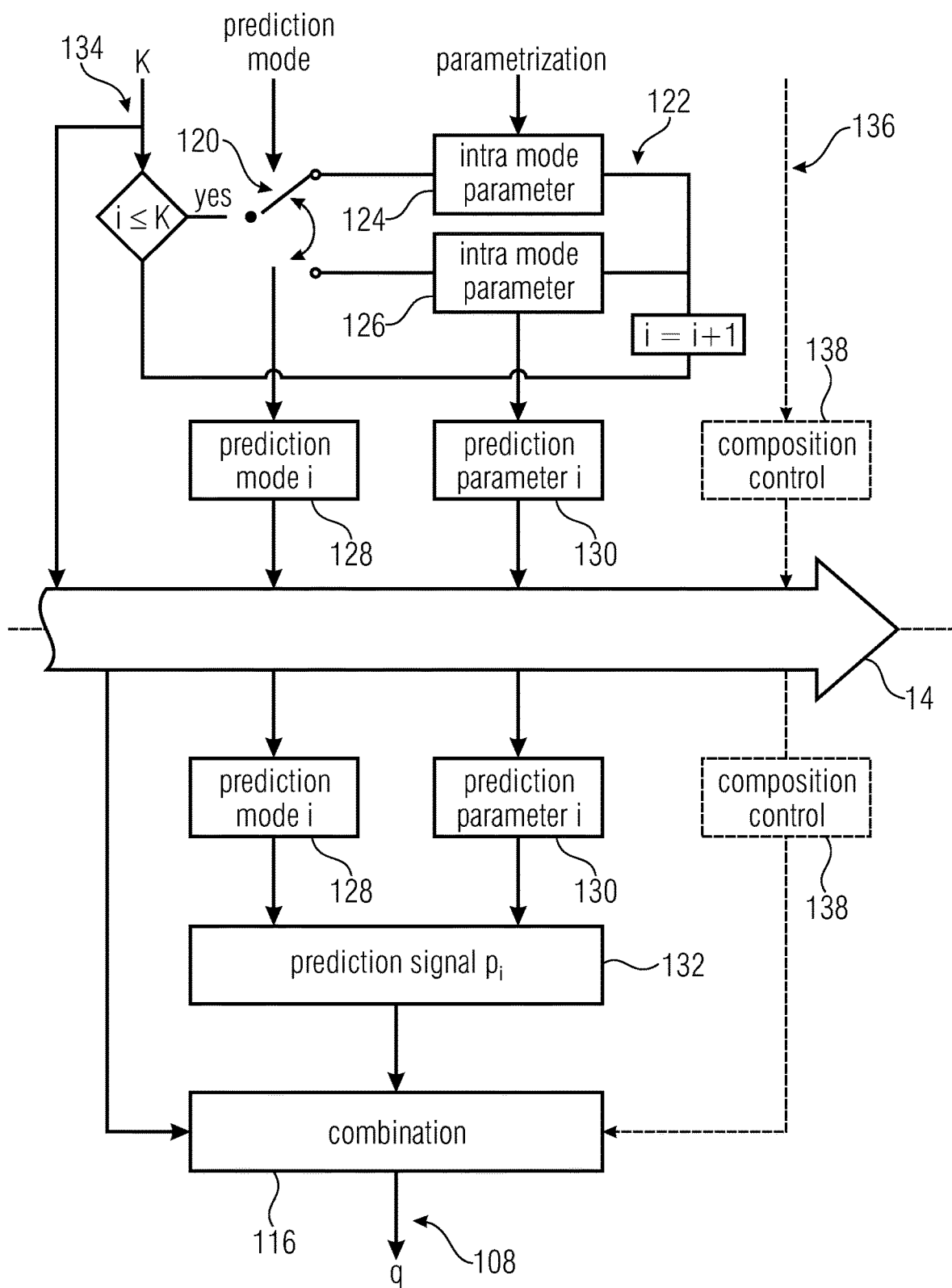
FIG. 5 shows a schematic diagram illustrating in terms of what the individual primitive predictions may be specified by use of implicit and/or explicit signaling.

Just in order to ease the understanding of the following description, FIG. 5 illustrates the circumstance that parameterizations need to be shared among encoder and decoder with respect to the question of how to derive the individual primitive predictions $p_i$ on the basis of the associated prediction mode. In particular, FIG. 5 illustrates that the encoder selects for each primitive prediction $p_i$ at 120 the prediction mode to be chosen for block 106 and at 122 the parameterization thereof. If the prediction mode selected at 120 is, for instance, an intra prediction mode, the parameterization selected at 122 is an intra mode parameter. The set of one or more intra mode parameters 124 may, for instance, distinguish between angular modes mutually differing, for instance, in the intra prediction direction or angle, and, optionally, one or more further modes such as a DC and a planar mode as indicated above. If the selected prediction mode is an inter prediction mode, the set of one or more inter mode parameters 126 may comprise a motion vector and, optionally, a reference picture index and, optionally, a predictor index. In particular, the motion vector in parameter set 126 may be signaled as a motion vector difference relative to a motion vector predictor obtained from a spatial and/or temporal neighborhood of block 106 by spatial and/or temporal prediction, and in case of parameter set 126 including a predictor index, same may choose one out of several such predictor candidates as the basis for the motion vector difference. Thus, for each primitive prediction $p_i$, the data stream 14 allows for the decoder to derive the prediction mode 128 for this primitive prediction $p_i$ of block 106, as well as the associated set of one or more prediction parameters for parameterizing the corresponding mode 128 so as to yield prediction $p_i$, namely prediction parameter set 130, using this mode parameterized accordingly. The primitive predictions, thus obtained at 132, are then combined using combination 116 to yield the final combined prediction signal q, 108. As will be explained in more detail below, different mechanisms may be used in order to relax the burden associated with the signaling overhead associated with keeping encoder and decoder synchronized or, alternatively speaking, in order to signal information 128 and 130 for each primitive prediction to the decoder. Another parameter, which controls the combination 116 and, thus, compose prediction signal 108, which is, in accordance with embodiments of the present application described in more detail below, subject to sub-picture level variation by the encoder, may pertain to:

1) The number of recursions or iterations K. As illustrated in FIG. 5 at 134, K may be varied at sub-picture granularity such as, for instance, for each block such as block 106.

Figure 6:
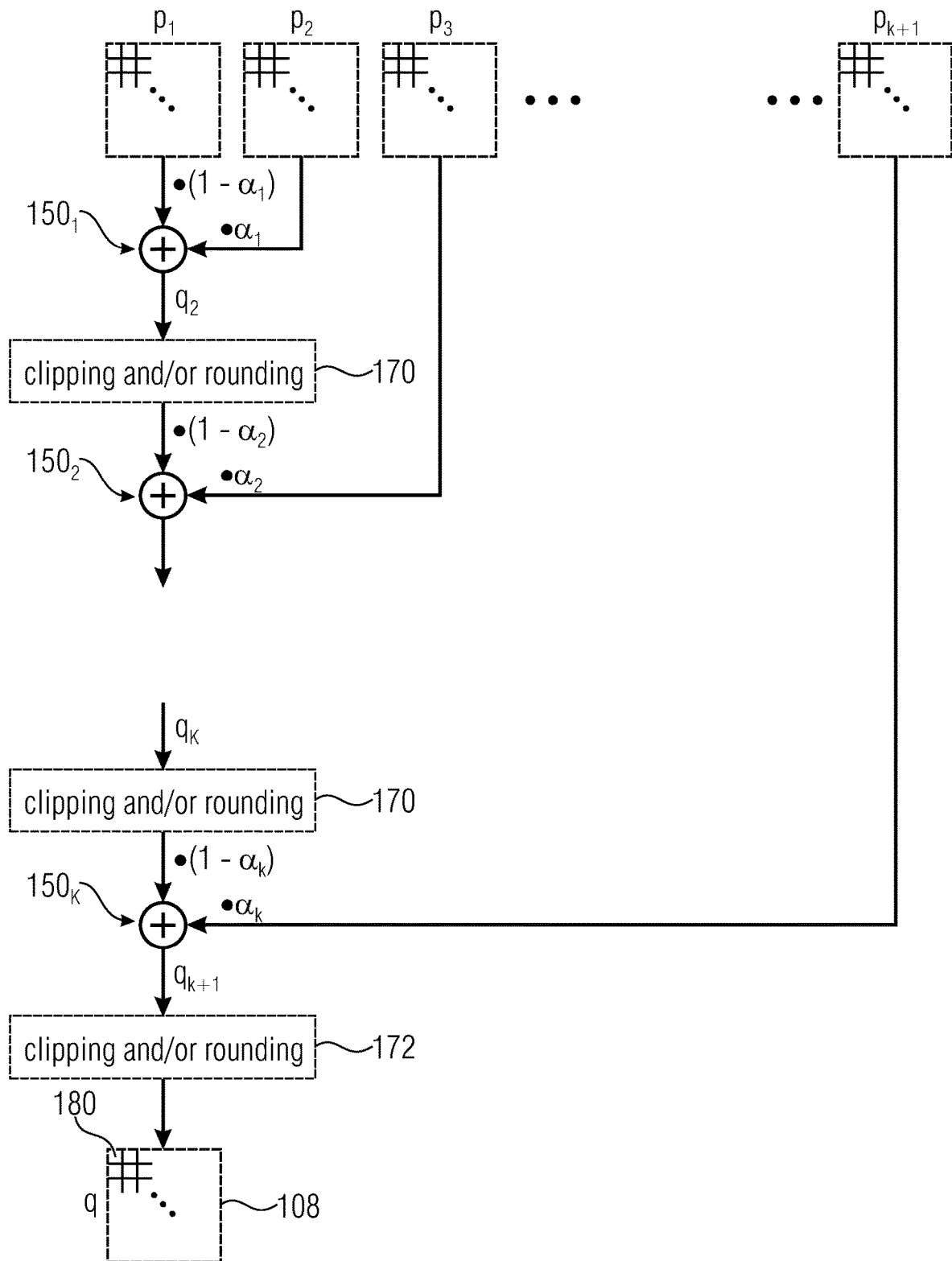
FIG. 6 shows a schematic diagram illustrating a concept of composing a prediction signal by an iterative approach as depicted in FIG. 5, according to an example where one primitive prediction contributes to the composed prediction signal per iteration in a manner weighted by a contribution factor added to the intermediate sum, weighted, in turn, by one minus the contribution factor.

2) The number of recursions or iterations K may be varied in case of using the iterative composition approach of FIG. 6. If K is varied, this varies indirectly also the cardinality of prediction collection 110 and, in case of allowing more than one mode for the additional predictions $p_2$ to $p_{v_{K+1}}$, the cardinality of mode collection 112. One of, or both, of the latter cardinalities may however, also by varied when not using the iterative approach.

3) The combination 116 may be controlled at subpicture granularity. In case of using the iterative composition of above formula, for instance, the function $f_n$ of each iteration may be subject to variation by the encoder. As will be outlined in more detail below, the functions $f_n$ may be parameterizable with the encoder selecting 136 the parameterization of functions $f_n$ with submitting or signaling the respective composition control information 138 via a data stream 14 to the decoder for performing the composition of combination 116 accordingly.

The signaling associated with, or controlling the composition 116, as illustrated in FIG. 5, namely the number of iterations K, the prediction mode 128 and its parameterization for each involved primitive prediction and the composition control 138 need not to be explicitly signaled in the data stream for block 106. That is, these information items need not to be transmitted as extra information for block 106 or some sub-region of picture 12, block 106 is located in. Rather, as will be outlined in more detail below, some or all of this information might be signaled by way of implicit signalization meaning that the decoder is able to infer the respective information entity from other data in the data stream 14 relating to, for instance, the same information type but with respect to another block neighboring, for instance, block 106 or relating to another coding parameter issue such as one relating to, for instance, the residual coding or the like. Embodiments are described below.

In other words, FIG. 5 made clear that the prediction control information such as information 128 on prediction mode, prediction mode parameterization related information 130 such as intra modes, reference indices and motion vectors, for generating the primitive prediction signals $p_1, \ldots, p_N$ should be known to the decoder and should therefore be transmitted at a side information in data stream 14. Further, it has been outlined that this prediction related information may be transmitted or signaled explicitly or implicitly. Explicit signalization could be described as transmitting a part or all of the prediction related information such as an intra prediction mode or a reference index, a motion vector predictor index, a motion vector predictor index or a motion vector difference specifically for block 80 or some sub-region of the picture which block 80 is located in, while implicit signalization could be described as meaning that the prediction related information or part thereof is inferable from other portions of data stream 14 such as portions of data stream 14 relating to other blocks than currently predicted block 80, i.e. for blocks which block 80 is not located in. See for instance FIG. 4. The block 106 currently predicted has been denoted there using reference sign 106. This reference sign has been used to indicate that the tasks illustrated in FIG. 4 are performed for this block 106 specifically. However, bloc 106 is a block 80 as illustrated by the 80 in parenthesis behind 106, and the tasks concerning prediction composition may alternatively be performed for all blocks 80 or, for instance, blocks 80 for which $p_i$ is of inter prediction mode. Thus, from such blocks in the neighborhood, some of the information involved in deriving the further primitive predictions and the number thereof, or the number of iterations, may be inferred, with activating for instance, the inference by way of a merge indicator or merge flag as will be described with respect to FIG. 8. The other neighboring blocks may treated as ones where K is zero, i.e. the number of additional primitive predictions is zero.

In the examples outlined in more detail below, for instance, implicit signalization is used by way of adapting and further developing the merge scheme or merge mode as used, for instance, in HEVC or H.265. In a particular embodiment, for instance, the information 128 and 130 or 130 alone is signaled in the data stream 14 for a subset of $P \subset \{p_1, \ldots, p_N\}$ explicitly and for the complementary set implicitly.

The prediction mode, for instance, may be set by decoder and encoder by default as far as, for instance, primitive predictions except for the first primitive prediction $p_1$ are concerned.

As outlined above with respect to reference sign 138, the composition operators $f_1, \ldots, f_K$ should also be known to the decoder. They can be either fixed or inferred from already transmitted syntax elements, or explicitly signaled in the bit stream.

In one particular embodiment, the individual $f_1, \ldots, f_K$ can be obtained from a generic composition operator h as $$f_n(q_n, p_{v_n+1}, \ldots, p_{v_{n+1}}) = h(q_n, p_{v_n+1}, \ldots, p_{v_{n+1}}, \alpha_n).$$

Here, it is assumed, that the number of constituent primitive prediction signals is identical for all the composition operators $f_1, \ldots, f_K$, i.e. $v_{n+1} - v_n = m$. The vector $\alpha_n$ parametrizes the generic composition operator h such that the specific composition operator $f_n$ is obtained. Thus, if the generic composition operator h is fixed, only the $\alpha_n$ have to be specified. Note that the dimension of $\alpha_n$ is independent from the dimensions of $p_{v_n+1}, \ldots, p_{v_{n+1}}$ (and $q_n$) and can also be one, making $\alpha_n$ a scalar. Since the value of $\alpha_n$ specifies the composition operator $f_n$, it also should be known to the decoder. It may either fixed, or inferred or signaled in the bit stream.

For the particular case of mean-preserving weighted linear superposition and one primitive prediction signal in each composition operation (i.e., $v_{n+1} - v_n = 1$), the generic composition operator h could be defined as $$h(q_n, p_{n+1}, \alpha_n) = \alpha_n \cdot p_{n+1} + (1 - \alpha_n) \cdot q_n$$

where $\alpha_n \in \mathbb{R}$ is a weighting or composition factor. Since the weighting factor $\alpha_n$ should be known to the decoder, it may either be fixed or inferred or signaled in the bit stream. If only a (typically small) number of values for $\alpha_n$ is feasible, an index value $\gamma_n \in G_n \subset \mathbb{N}$ can be transmitted instead, which indicates the actual value of $\alpha_n$. The actual value of $\alpha_n$ is then derived either by use of a look-up table, or by computation or by other means. Note that the allowed values of $\alpha_n$ do not need to be identical for all n. Further note, that either $\alpha_n$ or $(1-\alpha_n)$ can also be negative, leading to a subtraction of the corresponding prediction signal.

Figure 7:
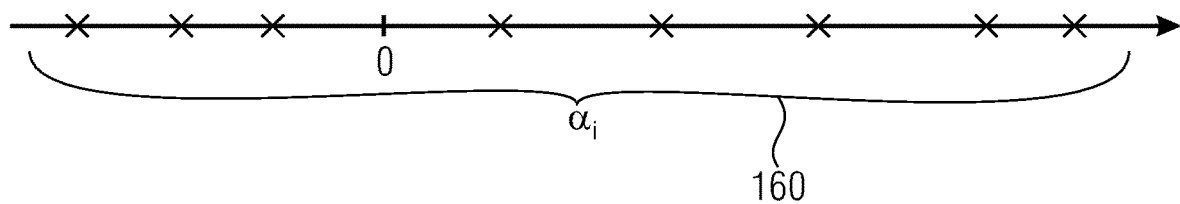
FIG. 7 shows a schematic diagram illustrating the value domain of signalable discrete values for the contribution value for the additional further primitive predictions in FIG. 6.

The latter procedure performed by decoder and encoder to yield the composed prediction signal 108 is depicted in FIG. 6. K+1 primitive predictions $p_1 \ldots p_{K+1}$ exist and K interations or successive summations $150_1$ to $150_K$ are performed. In each iteration $150_i$, the next primitive prediction $p_{i+1}$, weighted with the corresponding contribution factor $\alpha_i$, is added to the intermediate sum formed so far, i.e., $q_i$ where $q_1$ is $p_1$, weighted with one minus the corresponding contribution factor $\alpha_i$, i.e. $1-\alpha_i$. Thus, the additional primitive prediction $p_2$, for instance, effectively influences or contributes to the final composed prediction signal 108 at an effective factor of $\alpha_1 \cdot (1-\alpha_2) \cdot (1-\alpha_3) \cdot \ldots \cdot (1-\alpha_K)$ rather than $\alpha_1$. In effect, this means that especially for the earlier primitive predictions or primitive predictions with a lower index, the effective weighting may be set very fine although, for instance, the setting of the individual contribution factors $\alpha_1$ to $\alpha_K$ is limited to a limited number of discrete weight values. See, for instance, FIG. 7 which illustrates some possibilities with respect to the setting of the contribution values $\alpha_1$ by the encoder and the signaling thereof by a data stream 14 by implicit or explicit signalization. In particular, FIG. 7 illustrates that the value domain 160 of contribution value $\alpha_i$ to which contribution value $\alpha_i$ may be set by the encoder, i.e., is allowed to be set by encoder, and may be implicitly or explicitly signaled in data stream 14, may be limited to a discrete number of weight values indicated by a cross in FIG. 7. As illustrated in FIG. 7, the limited number of discrete weight values may comprise at least one negative value and at least one positive value. It may be that the Additionally or alternatively, at least one assumable value is outside the interval [0; 1] so that for this contribution value $\alpha_i$, either itself or $(1-\alpha_i)$ is negative. Even alternatively, merely positive values may, for instance, be allowed. As already stated above, indexing a table lookup or an arithmetic relationship between signaled information for $\alpha_i$ on the one hand and weight value on the other hand, might be used in order to signal contribution value $\alpha_i$. The number and the values of the discrete weight values of value domain 160 may be equal among contribution values $\alpha_i$ or may be different for the contribution values. Note that $\alpha_i$ or $(1-\alpha_i)$ may be signaled in the data stream.

Similarly to above, with $\alpha_n \in \mathbb{R}^2$ being a two-dimensional vector, the generic composition operator h could be defined as:

$$h(q_n, p_{n+1}, \alpha_n) = (\alpha_n)_1 \cdot p_{n+1} + (\alpha_n)_2 \cdot q_n$$

Analogously to above, the values of $(\alpha_n)_1$ and $(\alpha_n)_2$ should be known to the decoder and may either be fixed, inferred or signaled in the bit stream. In a sense, the previously described generic composition operator h with $\alpha_n \in \mathbb{R}$ can be viewed as a special case hereof, where $(\alpha_n)_2 = 1-(\alpha_n)_1$ is inferred.

In a further particular embodiment, a clipping and/or rounding operation can be included in a composition operator $f_n$. It is either fixed or inferred, or signaled in the bit stream whether a clipping and/or rounding operation is to be performed. It is also possible, that the clipping and/or rounding operation is only included for a subset of the composition operators $f_1, \ldots, f_K$ (e.g. if only for the overall prediction signal $q=q_{K+1}$ a clipping and/or rounding is to be performed, then only $f_K$ includes the clipping and/or rounding operation).

See, for instance, the dashed boxes 170 in FIG. 6. They indicated that each intermediate sum $q_2$ to $q_K$ may be subject to a clipping and/or rounding operation 170. Additionally, a clipping and/or rounding operation 172 may be applied to the final sum $q_{K+1}$ in order to yield the final composed prediction signal q. It should be clear that any rounding 170/172 forms a quantization considerably coarser than the computational accuracy at which the intermediate sums are computed and represented. Clipping and/or rounding operation 172 ensures, for instance, that the sample values of composed prediction signal q, 108, are within the allowed representation range or value domain of the sample values at which picture 12 is coded.

Furthermore, a composition operator $f_n$ can be scalar in the sense, that the resulting sample value of the (new intermediate) prediction signal $q_{n+1}$ at a particular sample position only depends on the values of the primitive prediction signals $p_{v_n+1}, \ldots, p_{v_{n+1}}$ and the intermediate prediction signal $q_n$ at the same sample position.

Again, see, for illustration purposes, FIG. 6. Each primitive prediction $p_i$ is a two-dimensional vector comprising a component or sample value per sample position 180 of composed prediction signal 108 or per sample position 180 of block 106/80, respectively, and the definition is done in a manner so that each sample position 180 of prediction signal 108 is solely determined based on the corresponding co-located sample positions within primitive predictions $p_1$. An alternative could be that some of the intermediate sums would be subject to some sort of filtering such as FIR filtering or the like.

The domain (e.g., dynamic range, bit depth, precision) in which the intermediate prediction signals $q_1, \ldots, q_{K+1}$ (or a subset thereof) are represented can be different from the domain of the primitive prediction signals $p_1, \ldots, p_N$.

In case of joint encoding of multiple color planes (e.g., R, G, B, luma, chroma, depth, alpha channel etc.), the composition operators can be either shared among a (sub-)set of the planes or be independent. It is either fixed, inferred or signaled in the bit stream, which planes are using the same composition operator.

The composition operators $f_n$ or h can be either defined for the whole video sequence, or they can vary at a given granularity (e.g., random access period level, picture level, slice level, block level, etc.). The granularity is either fixed or inferred, or signaled in the bit stream. Along with the composition operators themselves, also their number K may vary within the same or a different granularity. There can be an upper bound $K_{max}$, which limits the maximum number of composition operators. The value of $K_{max}$ is either fixed or inferred, or signaled in the bit stream.

The composition operators $f_n$ or h can be either signaled explicitly (e.g., by signaling the parameter vector $\alpha_n$) or implicitly (e.g., similar to the MERGE mode in HEVC/H.265). In the latter case, a reference to an already encoded set of composition operators is signaled and those composition operators are used (possibly after an adaptation, e.g. to the block size, the color channel, the bit depth etc.). A mixture of implicit and explicit signaling is also possible, e.g., the first $k_{implicit}<K$ composition operators $f_1, \ldots, f_{k_{implicit}}$ are signaled implicitly, i.e. by reference to already signaled composition operators, and the remaining $K-k_{implicit}$ composition operators $f_{k_{implicit}+1}, \ldots, f_K$ explicitly, i.e. by directly signaling the information which is needed for the decoder to be able to perform the composition operations. It is either fixed, inferred or signaled in the bit stream which composition operators are signaled explicitly and which are signaled implicitly.

Figure 8:
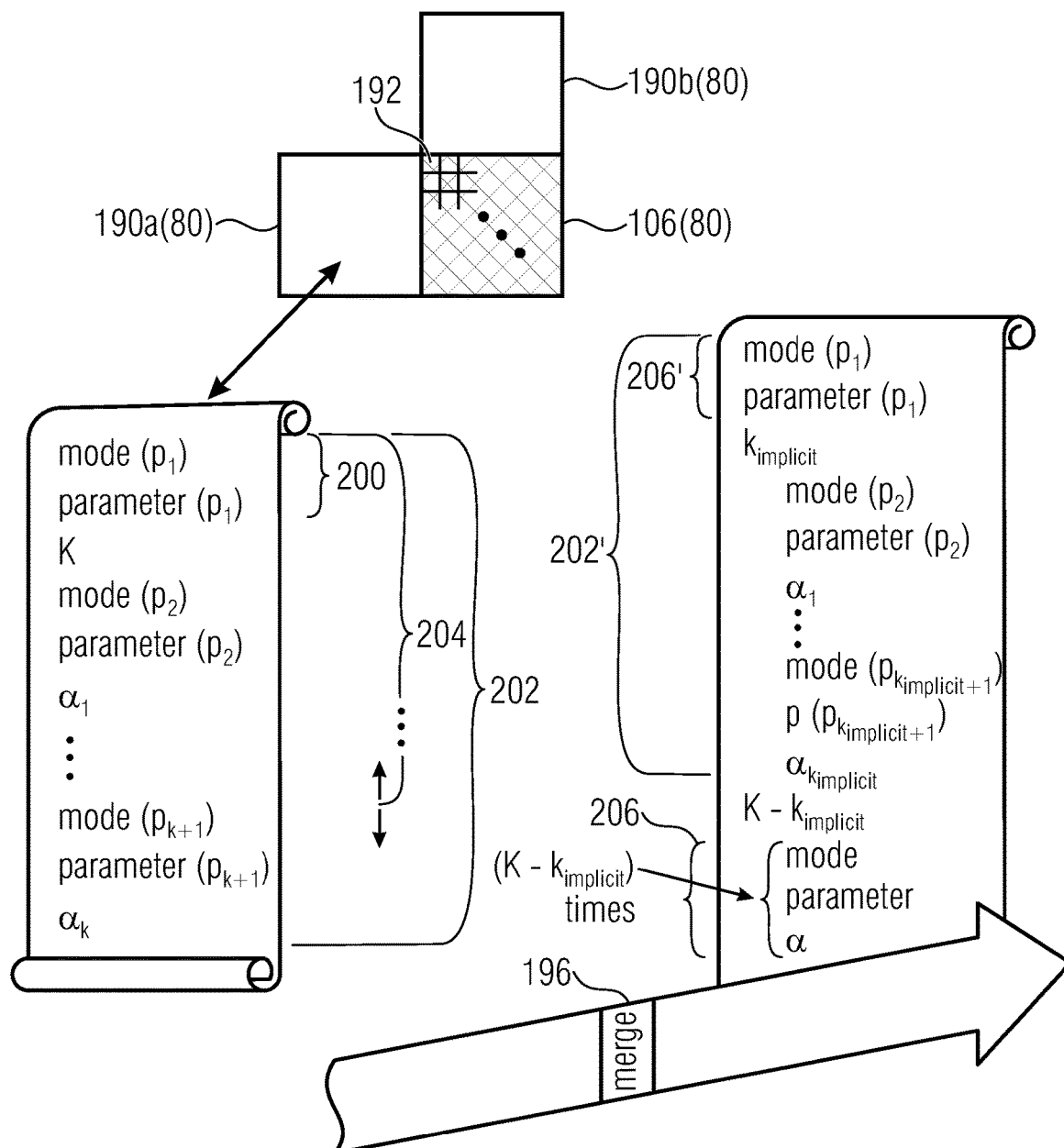
FIG. 8 shows a schematic diagram illustrating a possibility of combining the concept of composed prediction with a concept of merging.

Before proceeding with a description of possibilities of obtaining implementations of embodiments of the present application by modifying the HEVC codec, the latter aspect of combining the concept of merging with a concept of composed prediction shall be illustrated with respect to FIG. 8. FIG. 8 shows a currently processed, i.e., a currently decoded or currently encoded, block, i.e., block 106 which is a block 80. In its neighborhood, there are blocks 190a and 190b. They precede block 106 in decoding/coding order and are, thus, available for prediction or merging. It should be noted, that the fact that two neighboring blocks 190a and 190b as shown in FIG. 8, has merely been chosen for illustration purposes and that the usage of merely one neighboring block or more than two could be used as well. Further, the fact that both neighboring blocks 190a and 190b are shown as being of equal size as block 106 is also merely for illustration purposes. In fact, blocks 190a and 190b are blocks 80 as well, i.e., for these blocks a prediction signal 108 has been determined in the same manner as outlined above. Decoder and encoder may identify blocks 190a and 190b out of all previously processed blocks, i.e., blocks preceding in coding order, on the basis of, for instance, one or more predetermined sample positions of block 106. For instance, block 190a could be determined to be the block comprising the sample to the left of the upper left sample 192 of block 106, and block 190b could be determined to be the block 80 comprising the sample to the top of the upper left sample 192. Other examples are feasible, however, as well. Block candidates may, for instance, also comprise a block of another picture such as one collocated to block 106 such as one comprising the sample position collocated to the afore-mentioned specific position 192. A selection out of more than one merge candidates may be, in case of using merging for block 106, signaled in the data stream 14.

As blocks 190a and 190b are prediction blocks 80, i.e., blocks for which the prediction signal 100a has been determined, for each of these blocks there exist prediction related information 194 as exemplarily illustrated in FIG. 8 for block 190a. To be more precise, the prediction related information 194 led, with respect block 190a, to the composed prediction signal 108 for block 190a. Prediction related information 194 may comprise, for instance, information on the prediction mode and corresponding prediction parameters underlying the derivation of primitive prediction $p_1$. Additionally, information 194 indicates the numbers of additional primitive predictions N. FIG. 8 exemplarily assumes that the prediction signal composition follows the concept of FIG. 6 and indicates, for instance, that the prediction related information 194 indicates the number of additional primitive predictions K which equals the number of applied iterations 150, respectively. If K>0, which is a valid possibility, the prediction related information 134 additionally comprises information on mode and corresponding prediction parameter for deriving the additional primitive predictions $p_2 \ldots p_{K+1}$. Additionally, for each primitive prediction $p_i$, the corresponding contribution weight $\alpha_{i-1}$ is contained in the prediction related information 194. It should be clear that the prediction related information 194 for neighboring block 190a needs not to be conveyed in data stream 14 explicitly, but that prediction related information 194 may at least partially be implicitly signaled in data stream 14. In any case, encoder and decoder have access to, or knowledge on, the prediction related information 194 of block 190a at the time of processing block 106.

In order to save signaling overhead, the encoder has the opportunity to choose a merge mode for block 106 thereby signaling that at least a certain fraction of the corresponding prediction related information for block 106 is to be inferred from the prediction related information 194 of block 190a or some other merge candidate such as the corresponding prediction related information of block 190b. That is, the encoder may signal within a data stream 14 the activation of a merge mode for block 106 by way of merge information 196 with its merge information 196 activating the merge mode and, optionally, indicating the merge candidate to be used.

Possibly, the merge information 196 additionally comprises information on as to which fraction of the prediction related information 194 of the merge candidate is to be used for inference of the corresponding portion of the prediction related information 198 for the current block 106. According to one option, for instance, merely the information on how to derive the first primitive prediction $p_1$ is subject to the merging indicated by curly bracket 200. The corresponding information 200' within prediction related information 198 would, thus, be set to be equal to information 200. For any further primitive prediction, such as $p_2$, the prediction related information or parameters could be signaled in the data stream for that block 106 via information pointing into a list of prediction parameters used for neighboring bocks and related to the prediction mode of that particular primitive prediction. Note that the neighboring blocks contributing to the merge candidate list and those contributing to the latter list, and accordingly the blocks the prediction related information of which is pointed to in those lists by the merge information 196 and the signaling 206 might be different. For instance, prediction $p_i$ may be an inter predicted signal while $p_2$ is an intra predicted signal.

An alternative has just-been outlined: it could be that the merge information 196 contains additional signaling turning a bi-prediction mode for $p_1$ of block 190a to a uni-predictive mode for $p_1$ of block 106 with additionally choosing as to which of the two hypotheses of the bi-predictive mode for block 190a shall form the basis for the uni-predictive mode of primitive prediction $p_1$ of block 106. An alternative could be that the merge information 196 contains additional signaling restricting the determination of the merge candidates to one which use a bi-prediction mode for $p_i$ with additionally signaling as to which of the two hypotheses of such bi-predictively coded merge blocks shall form the basis for the primitive prediction $p_1$ of block 106. In both alternatives, the mode of $p_1$ of block 106 is set to be a uni-predictive mode. In the latter alternative, which is discussed herein below again in more details, the merge information 196 would, thus, restrict the formation of the set of merge candidates to ones being bi-predicted inter blocks with possible signaling an information as to which thereamong is final chosen as the merge partner of block 106. In the former alternative, this restriction is left off, and the signaled merge candidate may be uni-predictive or bi-predictive with respect to $p_1$, and, if bi-predictive, merely the signaled hypothesis is used for parametrizing the uni-predictive mode derivation of $p_1$ for block 106.

Another option would be to, for instance, subject—in addition to portion 200—the number of additional primitive predictions K and the corresponding information on how to derive the corresponding primitive predictions and how to set the corresponding contribution value to the merge operation as indicated by curly bracket 202. In that case, a corresponding portion 202' of prediction related information 198 of block 106 would be inferred from that portion 202 of block 190*a*, namely $k_{implicit}$ times the information on mode, associated prediction parameter and contribution value for additional primitive predictions $p_2 \ldots p_{k_{implicit}+1}$. That is, according to option 202, the prediction derivation information, i.e., mode and associated prediction parameter, as well as the contribution weight for all K additional primitive predictions $p_2$ to $p_{K+1}$ of the neighboring block 190*a* would be used for forming the corresponding primitive prediction derivation information and contribution weight information for the same number of primitive predictions for composing the composed prediction signal of block 106. That is, according to this example, if for block 106 the decision is mode to implicitly derive the prediction parameters for $p_1$ for block 106, i.e. portion 200, then this concurrently signals or triggers the implicit inference of the prediction parameters and contribution values for $p_2 \ldots p_{k_{implicit}+1}$. However, as shown in FIG. 8, the encoder may additionally decide to extend the number of additional primitive predictions for the current block 106 relative to setting $k_{implicit}$ to be equal to K of the neighboring block 190*a*. The encoder may signal within data stream 14 the offset or different $K-k_{implicit}$ to signal a number of explicitly signaled primitive predictions. Accordingly, the prediction related information 198 for block 106 will then explicitly signal in data stream 14 for block 106 how to derive the corresponding primitive predictions $p_{k_{implicit}+2} \ldots p_{K+1}$. It should be clear that K in information content 198 relates to the number of additional primitive predictions for block 106, while K within information 194 relates to block 190*a*, and that both parameters may set differently. They both may be limited by some $K_{max}$ which, as denote above, may be set to a default value, or may be signaled in data stream 14.

Instead of option 202, it may be possible that the encoder has the additional freedom to signal that not all additional primitive predictions K of neighboring block 190*a* are to be used for setting-up the prediction related information 198 for current block 106. In other words, the data stream 14 may be used to signal how to modify K of block 190*a*, i.e., the merge candidate, to obtain $k_{implicit}$ for block 106. The latter option is illustrated in FIG. 8 using a curly bracket 204. Which of options 200 to 204 is used may depend on the implementation. For instance, one of options 200 to 204 may be used in a fixed manner by encoder and decoder. Alternatively, some information may offer a switching between two or all of options 200 to 204. Instead of providing the encoder with the opportunity of modifying K within information 194 relating to block 190*a* to yield $k_{implicit}$ for block 106 and informing the decoder thereabout via signaling in the data stream 14, the relationship between K within information 194 relating to block 190*a* and $k_{implicit}$ for block 106 may by fixed by default or determined by implicit signaling.

With respect to FIG. 8 it should be noted that it might be known by default as to which prediction mode, i.e. intra or inter, is used for any of the further primitive predictions $p_2$ to $p_{K+1}$ of block 106 within prediction related information 198. Accordingly, no syntax relating to this circumstance might have to be conveyed in the data stream 14 as far as the explicitly signaled primitive predictions are concerned. A similar statement might be true for $p_1$ of block 106. It may be, for instance, that the merge option/operation may merely be activated by a respective merge flag, for instance, for blocks 106 for which, in the data stream, it has already been signaled that $p_1$ of block 106 is of a certain mode, such as inter mode, or the merge activation itself concurrently reveals that $p_1$ of block 106 is of the certain mode as the merge candidate set (list has been constructed accordingly by merely admitting candidates for which $p_1$ is of the respective prediction mode).

Let's now turn to the presentation of possible implementations of embodiments of the present application achieved by modifying the HEVC/H.264 codec. In HEVC/H.265, each picture is divided into a number of Coding Tree Units (CTUs), each of which can be further subdivided into Coding Units (CUs). The CU can again be further split into Prediction Units (PUs) and Transform Units (TUs). The aforementioned composed prediction may be signaled at PU level. In addition to the ordinary prediction parameters of HEVC/H.265 (i.e., intra prediction mode or motion vectors and reference indices), further prediction parameters (also either INTRA or INTER) can be signaled together with composition information, which indicate how the individual prediction signals that are obtained from the individual prediction parameters are composed into the resulting overall prediction signal. That is, block 106 described before, might be a PU block according to HEVC nomenclature. The availability of additional prediction parameters may be indicated by one additional syntax element. If this syntax element indicates absence of additional prediction parameters, no further data needs to be transmitted. Otherwise, the syntax elements corresponding to the additional prediction signal follow, together with data which specify how the composition operation of the ordinary HEVC/H.265 prediction signal and the additional prediction signal is to be performed. In a simple case, a weighting or contribution factor for the additional prediction signal is transmitted. This factor can be signaled either directly or as an index into a look-up table from which the actual weighting factor is obtained. If more than one additional prediction signal is used, the signaling starts from the beginning again, i.e. one syntax element is signaled which indicates if more additional prediction signals follow. Then the signaling continues as described before.

In the latter statement, one way of signaling K or, alternatively, $K-k_{implicit}$ for block 106 has been disclosed. In particular and as will be exemplified in the syntax examples presented in the following, it is possible to indicate in the data stream 14 for block 106 sequentially, additional primitive prediction by additional primitive prediction, namely by way of a corresponding flag, whether an additional explicitly signaled primitive prediction follows for the current block in the data stream 14 or not and, accordingly, whether for this further additional primitive prediction, the prediction parameter and its contribution weight follows or not. These flags may, as exemplified in the following, be transmitted in the data stream 14 in a manner interleaved with a corresponding explicit information on the primitive prediction derivation information and corresponding contribution weights. Summarizing, $k_{implicit}$ primitive predictions may be extended by $K-k_{implicit}$ explicitly defined primitive predictions. The parameters controlling the $k_{implicit}$ primitive predictions are derived from the merge candidate. The number of $K-k_{implicit}$ additional explicitly defined primitive predictions is signaled for block 106 in data stream 14. This may be done by sending one flag of a certain state per additional explicitly defined primitive prediction followed by one bit of the other state (optionally, unless a maximum number $K_{max}$ has been reached). The information on the explicitly defined primitive predictions, namely 206 in FIG. 8, is conveyed in the data stream 14 for block 106.

It should be noted that FIG. 8 illustrates that for each primitive prediction participating in the composition of the prediction signal for block 106, the mode is indicated by information 198. This does not mean, however, that this mode indication would have to be conveyed within data stream 14 for each of these primitive predictions. Rather, for some of these primitive predictions, at least, it might be known by default as to which mode the respective primitive prediction is of. For instance, some of the embodiments outlined in more detail below presume that any of the further primitive predictions $p_2, \ldots, p_{K+1}$ are of the inter prediction mode so that there is no need to spend signaling overhead on that.

Let's briefly compare the description of FIG. 8 with the merge mode of HEVC and briefly describe as to how HEVC might be modified with respect to the merge mode so as to form one implementation example for the embodiment described with respect to FIG. 8. In HEVC/H.265, the MERGE mode allows to use INTER prediction parameters from already transmitted neighboring or temporally co-located blocks. This reduces the involved amount of data. Instead of signaling all of inter_pred_idc (which indicates whether list0, list1, or bi-prediction is used)

motion vector predictor index/indices (in case of bi-prediction)

reference picture index/indices (in case of bi-prediction)

motion vector differences only a merge index is signaled which indicates the Prediction Unit (PU) whose prediction parameters are to be re-used for the current PU.

As described with respect to FIG. 8, it is also possible to use the MERGE mode for one or more of the primitive prediction signals. In other words, e.g. if for the first primitive prediction signal $p_1$ the MERGE mode is used, it is possible to transmit one or more additional prediction signal(s) namely the explicitly defined ones, and to compose those into one overall prediction signal as described above. Furthermore, by additional signaling, it is possible to restrict the MERGE mode such that only part of the available prediction data is used for $p_1$ (e.g., list0 or list 1 prediction instead of bi-prediction) or that the available prediction data is modified (e.g., quantized to full-pel or half-pel motion vector accuracy with or without a shift on the resulting motion vector grid). The way in which the MERGE mode is restricted, is indicated by further syntax elements (e.g., for the case of bi-prediction to uni-prediction with one flag which indicates whether list0 or list1 prediction is to be used).

If the used MERGE candidate (as indicated by the merge index) uses composed prediction, all the constituent primitive prediction signals or a subset thereof may be used for the current primitive prediction signal, namely the implicitly defined primitive predictions. It is either fixed, or inferred, or explicitly signaled which subset out of $p_2$-$p_{N+1}$ of the merge neighbor is used for implicit definition. For example, it can be fixed that in the aforementioned case of bi- to uni-prediction restricted MERGE mode, not only one of the two motion parameters specifying the bi-prediction signal is discarded, but all additional primitive prediction signals as well. In another example, if no such restriction is imposed, all primitive prediction parameters of the used MERGE candidate can be used for the current block.

In HEVC/H.265, the MERGE candidate list is constructed in such a way that redundant entries are avoided. In the context of composed prediction this implies that the motion parameter not only of the first primitive prediction signal $p_1$ may be checked for equality, but of all the other primitive prediction signals as well.

An example for the order of the predictors as specified in the bit stream, see FIG. 9, which shows a fraction of a PU syntax for defining information 206. The first prediction hypothesis $p_1$ may be an "ordinary" (i.e., INTRA, uni-predicted INTER, or bi-predicted INTER) prediction signal. Note that for the special case of the MERGE mode in HEVC/H.265 (or something similar), i.e. a prediction mode where reference to another coded block is made and the prediction parameters from there are also used for the current block, it is possible to restrict the usage of bi-prediction to one of the two constituent prediction signals by up to two syntax elements (indicating if such restriction applies, and when yes, which of the two [list0 or list1] prediction signals is to be used). After this first "ordinary" prediction hypothesis, it follows a series of syntax elements.

The variable NumMergedAdditionalHypotheseis 208 gives the number of additional hypotheses which have been "inherited" via MERGE mode from a block which itself has additional hypotheses. The variable MaxNumAdditionalHypotheseis 209 constrains the total number of additional hypotheses. Its value can be either fixed or given by some profile/level constraints or transmitted in the bit stream etc.

In particular, in accordance with the example of FIG. 9, the number of explicitly defined primitive predictions is signaled by way of a sequence of flags 210, additional_hypotheseis_flag. The number of flags 210 having a certain state, namely being one, defines the number of explicitly defined primitive predictions and is followed by a flag 210 being of the other state, being zero. Each flag 210 being 1, is followed by the information on how the respective additional primitive prediction is construed. In this example, it is presumed that each of these additional primitive predictions is of the inter prediction mode. Accordingly, the following syntax elements are transmitted for each additional explicitly defined primitive prediction: ref_idx_add_hyp 212 indicates the reference index of the reference picture of the respective additional explicitly defined primitive prediction i, i.e., the one for which the $i^{th}$ flag 210 is 1; a syntax portion mvp_coding, 214, comprises a motion vector difference, i.e., the difference to a motion vector predictor which, when added to the latter motion vector predictor yields the motion vector for setting-up/deriving the $i^{th}$ primitive prediction; mvp_add_hyp_flag 216 is a flag which selects one out of two motion vector predictors; instead of a flag, as syntax element with more states may be used or it may be missing if only one predictor is used in encoder and decoder; the syntax element add_hyp_weight_idx, 218, is indicative of the contribution weight at which the $i^{th}$ primitive prediction contributes to the composed prediction signal, wherein $\alpha_n$ or $(1-\alpha_n)$ may be indicated by 218. The concept of FIG. 6 may be used in accordance with FIG. 9. As seen in FIG. 9, the syntax elements 212 to 218 merely follow the $i^{th}$ flag 210 if the latter flag is 1, and the flags 210 being 1 and the corresponding information 212 to 218 are interleaved. Further, no flag 210 is transmitted if the fact that no further primitive prediction may follow is already known due to the fact that the maximum number of allowed additional primitive predictions defined by 209 has been reached already. As already described above, the encoder may signal the value of variable 209 in the data stream for the whole video, a sequence of pictures or on a picture by picture basis, for instance. Further, as already described above, variable 208 may define the number of already implicitly defined primitive predictions. In accordance with an embodiment, this variable is set to 0 inevitably, i.e., all additional primitive predictions are explicitly defined ones, and in accordance with another embodiment, this variable 200 defines the number $k_{implicit}$ of FIG. 8.

In the syntax table given above, the value of add_hyp_weight_idx[x0][y0][i] specifies the weighting factor (by indexing into a look-up table) for the $i^{th}$ additional hypothesis at spatial location (x0,y0) (given in luma samples). Consequently, the spatial granularity is at prediction block-level (CU or PU, in HEVC/H.265).

Please note an advantage of the iterative composition according to FIG. 6 over a non-iterative approach of combining several primitive predictions. In particular, the number of needed prediction sample buffer arrays is not increased compared to bi-prediction, since one buffer can be used to accumulate the individual prediction hypotheses, whereas another buffer contains the current prediction signal. Besides that, it allows a moderate complexity encoding algorithm, where the individual hypotheses are determined one after the other in the spirit of a "greedy algorithm" (i.e., local optimization), possibly followed by a refinement stage, where the prediction parameters (i.e., motion vectors) of all hypotheses are varied in a local neighborhood of their previous value, possibly iterating multiple times over all hypotheses until either a maximum number of iterations is reached or no further improvement has been achieved.

Further, a few remarks shall be made with respect to the possibility of using non-linear operations such as the rounding and/clipping operations 170 and 172 in forming the composed prediction signal. Independent of the question whether for the accumulation of the individual predictors/hypotheses a higher bit-depth accuracy (e.g., 14 bit) than the actual representation bit-depth (e.g., 10 bit) is used, from a practical point of view, there has to be at least some non-linear rounding operation after a new predictor/hypothesis is accumulated ("added"), since otherwise the needed bit-depth for storing the new accumulated prediction signal would be increased by one bit for each additional predictor. (Assume, the accumulation bit depth is 10, the so-far accumulated sample value at a given location is 1023, and the corresponding sample value for the current, additional hypothesis is 1022, then the resulting value, if both predictors are weighted by 0.5, would be 1022.5, which cannot be stored in 10 bit—so there either should be some rounding, in order to keep the bit depth constant, or the bit-depth should increase with each new predictor.) Since keeping the bit-depth constant is typically desirable, a rounding is unavoidable, such that the composition should be done in an iterative manner and should not be expanded into one large weighted sum (or something similar).

Further note, that the weights $\alpha_i$ in FIG. 6 are not restricted to be in the range of [0 . . . 1]. In particular, the weights {3/4, 9/8, 17/16} for the current (accumulated) predictor and, correspondingly, {1/4, −1/8, −1/16}, for the additional hypothesis, respectively may be used, i.e., as (1−α) and a, respectively. By having operations 170, 172 involving clipping in addition to a rounding, the resulting prediction sample values are prevented from being out of range (e.g., <0 or >1023 for 10 bit) for the intermediate sums $q_i$ and the final composite predictor q.

The syntax table Of FIG. 9 relies on the fact, that the value of NumMergedAdditionalHypotheseis is already known during parsing. This might not be the case, since determining the list of merge candidates and, consequently, the used merge candidate might be a time-consuming task, which might be avoided during the parsing process and deferred until the actual decoding (i.e., computation of reconstructed sample values) is performed. In other words, according to FIG. 9, the parsing of the explicit information for defining the prediction parameters and even the number of explicitly defined primitive predictions of block 106 was dependent on the finally chosen merge candidate's prediction related information, namely particularly on the latter's number of additional primitive predictions K. If, however, due to transmission loss, the merge candidate may not be determined for sure at the side of the decoder, the decoder is not able to correctly parse the syntax concerning the number and prediction parameters concerning the explicitly defined primitive predictions 206 of block, thereby causing an increased transmission loss issue. Therefore, in the syntax chart of FIG. 10, this dependency is decoupled by preliminarily setting $k_{implicit}$ is set to 0 before parsing these information items from the data stream, namely the number of the prediction parameters as signaled by way of syntax elements 212 to 216 along with the associated contribution weight 218 and the number of explicitly defined primitive predictions of block 106 as signaled by way of the flags 210. In other words, the coding and parsing of the latter information items is rendered independent from any merge candidate's settings, especially any $k_{implicit}$ possibly derived therefrom, and especially of the finally selected one out of the merge candidates. However, in the corresponding decoding process the following two aspects have to be obeyed.

The effective list of additional hypotheses $p_2 \ldots p_{K+1}$ results from appending the signaled additional hypotheseis, i.e. the ones transmitted according to FIG. 10 using flags 210 and syntax elements 212 to 218 independent from the neighboring blocks' K, namely $p_{k_{implicit}+2} \ldots p_{K+1}$, to the $k_{implicit}$ merged additional hypotheses, i.e., $p_2 \ldots p_{k_{implicit}+1}$.

A constraint $K_{max}$ on the maximum size of the effective list may be given, namely by 209. If too many additional hypotheses are signaled such that the effective list is too large (because $k_{implicit}$ plus the number of explicitly signaled predictions as signaled via 210 to 218 exceeds $K_{max}$, the bit stream is invalid.

A restriction of the merge candidate list may exist as well. In the syntax table of FIG. 11, the changes relative to HEVC/H.265 are highlighted. In case of MERGE mode as activated by syntax element 226, merge flag, for B slices an additional syntax element 230 restricted_merge_flag is transmitted, indicating that a modified merge candidate is to be used. If this flag 230 is TRUE (i.e., equal to one), a further syntax element 232 restricted_merge_list is transmitted which indicates how the merge candidate is to be modified. If restricted_merge_list==0, only a list0 prediction is employed for the used merge candidate. Analogously, if restricted_merge_list==1, only a list1 prediction is employed for the used merge candidate. In any case, if restricted_merge_flag==1, all potentially available additional hypotheses of the used merge candidate are discarded, i.e., k implicit is set to 0 inevitably. Alternatively, syntax element 230 may signal a variation for the formation of the merge candidate list in that merely bi-predicted merge candidates are allowed. This possibility has been outlined above with respect to FIG. 8.

A further example is provided in FIG. 12. FIG. 12 shows a CU syntax example and illustrates that by highlighting changes relative to HEVC, that the embodiment provided with respect to FIGS. 9 to 11 are not restricted to the usage in connection with inter predicted blocks. In the example of FIG. 12, the concept of using compositions of predictors of a block 106 is also applied to intra predicted block 106/80. FIG. 12 shows the CU syntax. The number of explicitly defined additional primitive predictions is, again, signaled by flag 210. For each further explicitly defined primitive prediction, however, a syntax element 220 indicates the mode. That is, it indicates whether the hyp$^{th}$ additional explicitly defined primitive prediction is one construed by intra prediction or inter prediction mode. Depending thereon, intra prediction related syntax elements 222 which define the respective hyp$^{th}$ explicitly defined primitive prediction follow, all the syntax elements 210, 212, 214 and 216 defining the hyp$^{th}$ additional primitive prediction in terms of inter prediction details. In both cases, the contribution weight is also transmitted in the data stream, namely 218 or 228, respectively. According to the example of FIG. 12, the concept of composed prediction signals is, however, not only used for intra predicted blocks 106, but also for inter predicted blocks as is depicted in FIG. 13, which shows the prediction unit syntax called by the CU syntax of FIG. 12. Even here, for an inter predicted base prediction $p_1$, the mode of the further primitive predictions $p_2$ to $p_{K+1}$ may be a signaled one intra prediction related or inter predicted related. That is, the same syntax is applied for inter predicted PUs as the one shown in FIG. 12 for intra predicted blocks and accordingly, the same reference signs have been used in FIG. 13.

Put differently or using another terminology, the above embodiments thus revealed, inter alias, a video decoder and a video encoder for decoding/encoder a video from/into a data stream using block-based predictive decoding/encoding, wherein prediction for a predetermined block 106 involves the following: first prediction information in conveyed in the data stream 14. This may use merge mode by activating merge mode. That is, the first prediction information may comprise a merge flag 226. If the flag does not activate merge mode, the first prediction information may explicitly indicate prediction mode and associated parameter. Note that merely blocks 80 for which an inter prediction mode is applied for $p_1$ may, for example, be subject to the composite prediction, but it may also be possible that merely blocks 80 for which an intra prediction mode is applied for $p_1$, or both blocks, i.e. ones for which an inter prediction mode is applied for $p_1$, and ones for which an intra prediction mode is applied for $p_1$, are subject to the composite prediction. Based on the first prediction information, the first prediction signal $p_1$ is determined/derived, such as part of derivation 114 in FIG. 4. Further, a number K is derived from the data stream 14. In the embodiments, this was done by way of a flag 210, sequentially transmitted K+1 or K times, depending on whether is $K_{max}$ has already been reached. However, instead of such truncated unary code, another coding may be used. In particular, the interleaving of the flags 210 with the subsequently mentioned information in the data stream may be solved differently. Further, K may be coded in the data stream 14 predictively. For instance, above, $k_{implicit}$ may be seen as a predictor for K with merely K–$k_{implicit}$ being transmitted. K further prediction signals $p_2 \ldots p_{K+1}$ are determined and for each of the K further prediction signals, a composition weight. Explicit signaling and/or implicit signaling may be used for sake of keeping decoder and encoder synchronized, i.e. for transmitting the set of one or more prediction parameters for $p_2 \ldots p_{K+1}$ and for transmitting the contribution weights. For example, for all of $p_2 \ldots p_{K+1}$, the set of one or more prediction parameters may be transmitted explicitly. This set had been denoted 130 in FIG. 30 for all prediction signals $p_1 \ldots p_{K+1}$. In FIGS. 9 to 13, this set included 212 to 216 or 222, depending on the mode. The mode indication 220 might be included or signaled as well. However, all $p_2 \ldots p_{K+1}$ might be of inter prediction mode such as uni-prediction mode by default. The information on the contribution weights $\alpha_1 \ldots \alpha_K$ may also be transmitted explicitly and/or implicitly. For example, all of them may be transmitted explicitly by way of syntax elements 218/228. Indexing may be used as described above with respect to FIG. 7. The predetermined block 106 is finally predicted based on the first prediction signal and the K further prediction signals and the composition weights therefor. For prediction, as taught with respect to FIG. 6, each of the K further prediction signals may be sequentially added to the first prediction signal with weighting the respective further prediction signal with the composition weight for the respective further prediction signal and weighting an intermediate sum of the sequential addition, to which the respective further prediction signal is added, with one minus the composition weight. The contribution weight for each of the K further prediction signals may be conveyed in the data stream in a manner so that the contribution weight assumes one value out of a value domain which consists of a number of values which is equal for the K further prediction signals. The value domain may be equal for the K further prediction signals. At least one value may be outside [0; 1] for one of $\alpha_1 \ldots \alpha_K$. A clipping and/or rounding operation 170; 172 and/or another non-linear may be applied to at least for a subset of intermediate sums.

The following is also noted. Above examples revealed for the first prediction $p_1$ the possibility that same is subject to some sort of controlled restricted merge. For a block 106 for which a merge mode is activated, such as by a merge flag 226, a merge candidate restriction signaling 230 is signaled the data stream. The determination of a set of prediction parameter merge candidates for the predetermined block 106 is done with excluding from the set of prediction parameter merge candidates uni-predictive prediction parameter merge candidates, i.e. ones of blocks 190$a,b$, for which the information 194 indicates the non-usage of bi prediction for $p_i$, if the merge candidate restriction signaling 230 indicates a merge candidate restriction to bi-predictive prediction parameter merge candidates, and with admitting uni-predictive prediction parameter merge candidates to the set of prediction parameter merge candidates if the merge candidate restriction signaling 230 does not indicate the merge candidate restriction to bi-predictive prediction parameter merge candidates, i.e. blocks 190$a,b$, for which the corresponding information 194 suggests uni-prediction in addition to blocks 190$a,b$, for which the corresponding information 194 suggests bi-prediction. Note that the set of prediction parameter merge candidates may, in fact, be an ordered set, i.e. a list. The ordering may be done by comparison with each prediction parameter merge candidate with certain estimates or settings for the block 106. Note also that prediction parameter merge candidates or merge candidates, as they are mentioned here as well as in the previous description, relate to prediction related settings such as 200, 202 and 204, which might have been obtained from one neighboring block only, or from more than one such neighbor by some sort of averaging or some other combination or the like. Further, neighboring blocks may, as outlined above, also lie in other pictures than block 106. Even further, the set of prediction parameter merge candidates might have been additionally complemented by one or more default prediction parameter settings such as, for instance, in order to achieve a fixed number or cardinality of prediction parameter merge candidates in the set/list in case some neighboring blocks are missing. One of the set of prediction parameter merge candidates is selected for the predetermined block. An index, such as merde_idx in FIG. 12, may be used to this end. It indexes one out of the set of prediction parameter merge candidates. If the merge candidate restriction signaling 230 indicates the merge candidate restriction to bi-predictive prediction parameter merge candidates, the data stream contains a hypothesis selection indication 232. The determine the prediction information for the predetermined block is obtained by using uni-predictive prediction parameterized according to one of two hypotheses of the selected prediction parameter merge candidate, the one hypothesis being selected according to the hypothesis selection indication 232, if the merge candidate restriction signaling 230 indicates the merge candidate restriction to bi-predictive prediction parameter merge candidates, and prediction according to the selected prediction parameter merge candidate if the merge candidate restriction signaling 230 does not indicate the merge candidate restriction to bi-predictive prediction parameter merge candidates, namely bi-predictive prediction parameterized according to the two hypotheses of the selected prediction parameter merge candidate, if the selected prediction parameter merge candidate is bi-predictive, and uni-predictive prediction parameterized according to the selected prediction parameter merge candidate if the selected prediction parameter merge candidate is uni-predictive. As described above, in uni prediction, the prediction signal may be a shifted and interpolated region of a reference picture, i.e. a picture used for reference. The used reference picture is specified by the reference index and the location of the possibly interpolated region within the reference picture is specified relatively to the current block by the motion vector. Reference index and motion vector are adopted from the merge candidate or, differently speaking, are used for parametrizing the uni-prediction of block 106, i.e. from the unit-predictive one or the selected hypothesis of the bi-predictive one. In bi prediction, two motion-compensated prediction signals are linearly superposed such as using factor of 0.5 for both constituent prediction signals or some other weight ratio. Therefore, for bi-prediction, two reference indices and motion vectors are adopted from a bi-predictive merge candidate or used for parametrizing the bi-prediction. As is true with all mentioning of bi-prediction herein, here the combination of both hypotheses may be done fixedly by summing up both hypotheses at equal weight or some weight ratio signaled in the data stream on a per picture basis. Thus, depending on whether the merge candidate restriction signaling 230 indicating the merge candidate restriction to bi-predictive prediction parameter merge candidates or not, the derivation of $p_1$ was, according to this embodiment, done differently from the beginning onwards, namely the construction of the merge candidate list. However, in accordance with an alternative embodiment, a video decoder and a video encoder does not support the addition of further hypotheses in form of $p_2 \ldots p_{K+1}$, but merely handles merging for inter predicted blocks 106 in the manner just-outlined, i.e. there is merely $p_1$ for such blocks 106 and in the example of FIGS. 12 and 13, there would merely syntax elements 230 and 32 in addition to the HEVC syntax rather than also the one related to the addition of $p_2 \ldots p_{K+1}$. In so far, all the details presented above, as far as described with respect to the just highlighted issue of restricted merge candidate list construction, shall form a reservoir for further details for the recently highlighted embodiment focusing on merge with respect to $p_1$ irrespective of any other prediction signal, such as all details presented above with respect to FIGS. 1 to 3, for example, i.e. on how to implement encoder and decoder internally, and on how to subdivide the pictures into the blocks 80 containing the currently processed one, namely 106.

Further, the following is noted. Above examples also revealed for the first prediction $p_1$ the possibility that same is subject to some sort of controlled restricted merge in terms of the extent at which a merge candidate's prediction setting is reused for a current block 106, namely in terms of the number of adopted hypotheses in case the selected merge candidate being a bi-predictive one, i.e. one for which the bi-prediction mode applies, rather than restricting the merge candidate list formation to bi-predictive ones. For a block 106 for which a merge mode is activated, such as using merge_flag, a set of prediction parameter merge candidates for the predetermined block, is determined at decoder and encoder. The determination is done in a manner already explained above such as with respect to FIG. 8, or in the previous paragraph. One of the set of prediction parameter merge candidates for the predetermined block is selected such as using signalization of an index to the selected one in the data stream as has already been explained above with respect to FIG. 8, or in the previous paragraph, A merge candidate restriction signaling 230 in signaled in the data stream. This may be done inevitably, i.e. irrespective of the selected merge candidate being bi-predictive or not, so as to increase error robustness, or responsive to the selected merge candidate being bi-predictive with omitting signaling 230 in case of the selected merge candidate being uni-predictive. If the merge candidate restriction signaling 230 indicates a restricted merge operation, the data stream is additionally provided with a hypothesis selection indication 232. The prediction information for the predetermined block is then determined by using 1) if the selected prediction parameter merge candidate is uni-predictive, uni-predictive prediction parameterized according to the selected prediction parameter merge candidate, 2) if the selected prediction parameter merge candidate is bi-predictive, uni-predictive prediction parameterized according to one of two hypotheses of the selected prediction parameter merge candidate, the one hypothesis being selected according to the hypothesis selection indication 232, if the merge candidate restriction signaling 230 indicates the restricted merge operation, and 3) if the selected prediction parameter merge candidate is bi-predictive, bi-predictive prediction parameterized according to the two hypotheses of the selected prediction parameter merge candidate, if the merge candidate restriction signaling 230 does not indicate the restricted merge operation. In this manner, $p_1$ for block 106 has been determined. However, in accordance with an alternative embodiment, a video decoder and a video encoder does not support the addition of further hypotheses in form of $p_2 \ldots p_{K+1}$, but merely handles merging for inter predicted blocks 106 in the manner just-outlined, i.e. there is merely $p_1$ for such blocks 106. In so far, all the details presented above, as far as described with respect to the just highlighted issue of restricted merge candidate list construction, shall form a reservoir for further details for the recently highlighted embodiment focusing on merge with respect to $p_1$ irrespective of any other prediction signal, such as all details presented above with respect to FIGS. 1 to 3, for example, i.e. on how to implement encoder and decoder internally, and on how to subdivide the pictures into the blocks 80 containing the currently processed one, namely 106.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A video decoding apparatus for decoding a video from a data stream using block-based predictive coding, the apparatus comprising:
a processor; and
a memory storing instructions that, when executed by the processor, cause the processor to:
derive a collection of one or more primitive predictions for a block using a set of primitive prediction modes adapted for predicting blocks of a picture of the video, wherein each primitive prediction in the collection of primitive predictions is derived using a respective primitive prediction mode from the set of primitive prediction modes;
compose a composite prediction signal for the block by combining primitive predictions from the collection of one or more primitive predictions; and
predict the block using the composite prediction signal, wherein the memory stores instructions that, when executed by the processor, cause the processor to compose the composite prediction signal using a recurrence calculation:

$$q_1 = p_1$$

$$q_{n+1} = f_n(q_n, p_{v_n+1}, \ldots, V_{n+1}), \text{ for } n=1 \ldots K,$$

wherein:
$q = q_{k+1}$ is the composite prediction signal;
$p_1, \ldots p_{v_{k+1}}$ is the collection of one or more primitive predictions derived using the set of primitive prediction modes;
$v_1 = 1$ and $v_{n+1} = v_n + m_n$, $m_n$ is the number of primitive predictions that $f_n$ depends on, $m_1 + \ldots + m_k = v_{k+1} - 1$ and $v_{k+1}$ is the cardinality of the collection of one or more primitive predictions; and
$f_n$ is a function that maps an intermediate composite prediction signal $q_n$ and one or more primitive prediction signals $p_{v_n+1}, \ldots, p_{v_{n+1}}$ to a new intermediate prediction signal $q_{n+1}$.

2. The video decoding apparatus of claim 1, wherein the memory stores instructions that, when executed by the processor, cause the processor to derive the collection of one or more primitive predictions by:
  determining a set of one or more prediction parameters for the respective primitive prediction based on at least one of:
    prediction parameter information signaled in the data stream at a sub-picture granularity; or
    prediction parameter information for one or more neighboring blocks neighboring the block.

3. The video decoding apparatus of claim 1, wherein the memory stores instructions that, when executed by the processor, cause the processor to compose the composite prediction signal for the block by combining primitive predictions from the collection of the one or more primitive predictions according to a weighted superposition of the primitive predictions.

4. The video decoding apparatus of claim 1, wherein the memory stores instructions that, when executed by the processor, cause the processor to:
  derive a collection of one or more primitive predictions for a plurality of blocks of the picture using the set of primitive prediction modes, wherein each primitive prediction in the collection of primitive predictions is derived using a respective primitive prediction mode from the set of primitive prediction modes;
  compose a composite prediction signal for each block by combining primitive predictions from the collection of one or more primitive predictions; and
  predict each block using the composite prediction signal;
  wherein at least one of a cardinality of the collection of the one or more primitive prediction modes or a cardinality of the collection of one or more primitive predictions differ among the plurality of blocks.

5. The video decoding apparatus of claim 1, wherein a cardinality of the collection of one or more primitive predictions is greater than two.

6. A video encoding apparatus for encoding a video into a data stream using block-based predictive coding, the apparatus comprising:
  a processor; and
  a memory storing instructions that, when executed by the processor, cause the processor to:
    derive a collection of one or more primitive predictions for a block using a set of primitive prediction modes adapted for predicting blocks of a picture of the video, wherein each primitive prediction in the collection of primitive predictions is derived using a respective primitive prediction mode from the set of primitive prediction modes;
    compose a composite prediction signal for the block by combining primitive predictions from the collection of one or more primitive predictions; and
    predict the block using the composite prediction signal, wherein the memory stores instructions that, when executed by the processor, cause the processor to compose the composite prediction signal using a recurrence calculation:

$$q_1 = p_1$$

$$q_{n+1} = f_n(q_n, p_{v_n+1}, \ldots, p_{v_{n+1}}), \text{ for } n=1 \ldots K,$$

wherein:
  $q = q_{K+1}$ is the composite prediction signal;
  $p_1, \ldots, p_{v_{k+1}}$ is the collection of one or more primitive predictions derived using the set of primitive prediction modes;
  $v_1 = 1$ and $v_{n+1} = v_n + m_n$, $m_n$ is the number of primitive prediction that $f_n$ depends on, $m_1 + \ldots + m_k = v_{k+1} - 1$ and $v_{k+1}$ is the cardinality of the collection of one or more primitive predictions; and
  $f_n$ is a function that maps an intermediate composite prediction signal $q_n$ and one or more primitive prediction signals $p_{v_n+1}, \ldots, p_{v_{n+1}}$ to a new intermediate prediction signal $q_{n+1}$.

7. The video encoding apparatus of claim 6, wherein the memory stores instructions that, when executed by the processor, cause the processor to derive the collection of one or more primitive predictions by:
  determining a set of one or more prediction parameters for the respective primitive prediction based on at least one of:
    prediction parameter information signaled in the data stream at a sub-picture granularity; or
    prediction parameter information for one or more neighboring blocks neighboring the block.

8. The video decoding apparatus of claim 6, wherein the memory stores instructions that, when executed by the processor, cause the processor to compose the composite prediction signal for the block by combining primitive predictions from the collection of the one or more primitive predictions according to a weighted superposition of the primitive predictions.

9. The video decoding apparatus of claim 6, wherein the memory stores instructions that, when executed by the processor, cause the processor to:
  derive a collection of one or more primitive predictions for a plurality of blocks of the picture using the set of primitive prediction modes, wherein each primitive prediction in the collection of primitive predictions is derived using a respective primitive prediction mode from the set of primitive prediction modes;
  compose a composite prediction signal for each block by combining primitive predictions from the collection of one or more primitive predictions; and
  predict each block using the composite prediction signal;
  wherein at least one of a cardinality of the collection of the one or more primitive prediction modes or a cardinality of the collection of one or more primitive predictions differ among the plurality of blocks.

10. The video encoding apparatus of claim 6, wherein a cardinality of the collection of one or more primitive predictions is greater than two.

11. A video decoding method for decoding a video from a data stream using block-based predictive coding, the method comprising:
  deriving a collection of one or more primitive predictions for a block using a set of primitive prediction modes adapted for predicting blocks of a picture of the video, wherein each primitive prediction in the collection of primitive predictions is derived using a respective primitive prediction mode from the set of primitive prediction modes;
  composing a composite prediction signal for the block by combining primitive predictions from the collection of one or more primitive predictions; and
  predicting the block using the composite prediction signal, further comprising composing the composite prediction signal using a recurrence calculation:

$q_1 = p_1$ $q_{n+1} = f_n(q_n, p_{v_n+1}, \ldots, p_{v_{n+1}})$, for $n = 1 \ldots K$, wherein:
- $q = q_{K+1}$ is the composite prediction signal;
- $p_1, \ldots, p_{v_{k+1}}$ is the collection of one or more primitive predictions derived using the set of primitive prediction modes;
- $v_1 = 1$ and $v_{n+1} = v_n + m_n$, $m_n$ is the number of primitive prediction that $f_n$ depends on, $m_1 + \ldots + m_k = v_{k+1} - 1$ and $v_{k+1}$ is the cardinality of the collection of one or more primitive predictions; and
- $f_n$ is a function that maps an intermediate composite prediction signal $q_n$ and one or more primitive prediction signals $p_{v_n+1}, \ldots, p_{v_{n+1}}$ to a new intermediate prediction signal $q_{n+1}$.

12. The video decoding method of claim 11, further comprising:
    determining a set of one or more prediction parameters for the respective primitive prediction based on at least one of:
    prediction parameter information signaled in the data stream at a sub-picture granularity; or
    prediction parameter information for one or more neighboring blocks neighboring the block.

13. A non-transitory processor-readable medium storing a program, which when executed by a computer causes the computer to execute the method of claim 11.

14. A video encoding method for encoding a video into a data stream using block-based predictive coding, the method comprising:
    deriving a collection of one or more primitive predictions for a block using a set of primitive prediction modes adapted for predicting blocks of a picture of the video, wherein each primitive prediction in the collection of primitive predictions is derived using a respective primitive prediction mode from the set of primitive prediction modes;
    composing a composite prediction signal for the block by combining primitive predictions from the collection of one or more primitive predictions; and
    predicting the block using the composite prediction signal, further comprising composing the composite prediction signal using a recurrence calculation:

$q_1 = p_1$ $q_{n+1} = f_n(q_n, p_{v_n+1}, \ldots, p_{v_{n+1}})$, for $n = 1 \ldots K$, wherein:
- $q = q_{K+1}$ is the composite prediction signal;
- $p_1, \ldots, p_{v_{k+1}}$ is the collection of one or more primitive predictions derived using the set of primitive prediction modes;
- $v_1 = 1$ and $v_{n+1} = v_n + m_n$, $m_n$ is the number of primitive prediction that $f_n$ depends on, $m_1 + \ldots + m_k = v_{k+1} - 1$ and $v_{k+1}$ is the cardinality of the collection of one or more primitive predictions; and
- $f_n$ is a function that maps an intermediate composite prediction signal $q_n$ and one or more primitive prediction signals $p_{v_n+1}, \ldots, p_{v_{n+1}}$ to a new intermediate prediction signal $q_{n+1}$.

15. The video encoding method of claim 14, further comprising:
    determining a set of one or more prediction parameters for the respective primitive prediction based on at least one of:
    prediction parameter information signaled in the data stream at a sub-picture granularity; or
    prediction parameter information for one or more neighboring blocks neighboring the block.

16. A non-transitory processor-readable medium storing a program, which when executed by a computer causes the computer to execute the method of claim 14.

* * * * *